(12) United States Patent
Martinotti et al.

(10) Patent No.: US 8,165,012 B2
(45) Date of Patent: Apr. 24, 2012

(54) PROTECTION MECHANISMS FOR A COMMUNICATIONS NETWORK

(75) Inventors: Riccardo Martinotti, Savona (IT); Diego Caviglia, Savona (IT)

(73) Assignee: Ericsson AB, Stockholm (SE)

( * ) Notice: Subject to any disclaimer, the term of this patent is extended or adjusted under 35 U.S.C. 154(b) by 266 days.

(21) Appl. No.: 12/143,160

(22) Filed: Jun. 20, 2008

(65) Prior Publication Data

US 2009/0003192 A1   Jan. 1, 2009

(51) Int. Cl.
*G01R 31/08* (2006.01)
*G06F 11/00* (2006.01)

(52) U.S. Cl. ........................ 370/216; 370/241
(58) Field of Classification Search ................. 370/216, 370/217–218, 219, 220, 221–222, 225, 228, 370/404–407; 398/1–5
See application file for complete search history.

(56) References Cited

U.S. PATENT DOCUMENTS

| 2001/0002909 A1* | 6/2001 | Iwamoto | 370/395 |
| 2001/0052029 A1* | 12/2001 | Harbin | 709/251 |
| 2003/0021222 A1* | 1/2003 | Boer et al. | 370/216 |
| 2004/0233842 A1* | 11/2004 | Lanzone et al. | 370/216 |
| 2005/0243713 A1* | 11/2005 | Okuda | 370/216 |

* cited by examiner

*Primary Examiner* — Brandon Renner
*Assistant Examiner* — Stephen J Clawson
(74) *Attorney, Agent, or Firm* — Coats & Bennett, P.L.L.C.

(57) ABSTRACT

A method of path protection for a connection-oriented packet switched communications network is described using a protection hub in communication with a worker hub via a core protection path. Both the worker hub and the protection hub communicate with at least one provider edge device via a respective worker and protection paths. The method detects a failure in the communications network, indicates the failure to the at least one of the provider edge device, the worker hub, and the protection hub. The method then employs the core protection path if a failure occurs along a worker path is detected, or a worker path and a protection path in parallel if a failure occurs along the core protection path.

23 Claims, 18 Drawing Sheets

PROTECTION MECHANISMS FOR A COMMUNICATIONS NETWORK

CROSS REFERENCE TO RELATED APPLICATIONS

This application claims priority from foreign application PCT/EP2007/056482 filed on Jun. 28, 2007. That application is incorporated herein by reference in its entirety.

TECHNICAL FIELD

The invention relates to a connection-oriented packet switched communications network, and in particular to protection mechanisms for such a network.

BACKGROUND

There are many types of protection mechanisms that may be used in connection-oriented packet switched networks. Such protection mechanisms aim to provide protection to a network in the event of failures of paths, links or devices within the network so that disruptions to communications services are minimised. A further aim of such protection mechanisms is to avoid loss of traffic in the event of failures within the network.

It is known to provide protection mechanisms in a network operating a Hierarchical Virtual Private LAN Service (H-VPLS) under the standard IETF RFC 4762. H-VPLS enables Ethernet multipoint-to-multipoint Layer 2 Virtual Private Network (VPN) services. A feature of H-VPLS that facilitates the known protection mechanisms is the ability of network devices to automatically discover and signal to other network devices an association with a particular VPN so that the network devices query and learn VPN associations. Such automated behaviour is achieved by using messages which are part of the Operations, Administration and Maintenance (OAM) capabilities embedded within Ethernet as described in the standard ITU-T G.808.1.

A problem associated with the existing protection mechanisms operating under H-VPLS is that they are prone to configuration errors due to the large number of OAM messages required to keep track of VPN associations. Furthermore, centralised operating mechanisms require the network devices to interrogate the centralised servers to learn VPN associations. These centralised operating mechanisms add additional management functions to the overall network which may place a heavy burden in terms of network management. Network providers are hence required to 'spend' resources in their network in the form of such network management.

A further problem with the known protection mechanisms offered within H-VPLS is that they do not provide a sufficient level of reliability to provide a "carrier class" service. Such a carrier class service is required by Next Generation Networks (NGN) and is defined in a measurable way to determine whether a particular technology has the required quality of service. Typically there are five categories in which a particular technology must perform well to be termed a carrier class service. These five categories include service requirements, network requirements, security requirements, operational requirements, and network design requirements. For example, determining a service requirement may include using a mathematical formula to calculate a measure of voice quality as a so-called "R-value" according to ITU-T G.107. The way in which the other categories are determined are well known and will not be described further.

Currently available protection mechanisms may not attain the standard required to provide a carrier class service. Such a carrier class service must be able to provide protection in the case of a multiple failure within the network such as a failure of part of a worker path and a protection path at the same time. Such a double failure may be relatively common because the worker and protection paths may be physically located in the same duct in the ground which may be repeatedly dug up and recovered in a metropolitan area to perform maintenance on electricity, gas, water or other services. Conventional 1+1 protection schemes, where traffic in the network is actively transmitted on both a worker path and a protection path and the receiver is responsible for deciding which traffic flow to use, cannot be used to provide protection in the event of a double failure. Furthermore, conventional 1:1 protection schemes, where the traffic is only transmitted on the working path, but a protection path is allocated and used for sending traffic when a failure occurs, also cannot be used to provide protection in the event of a double failure. Recovery from a double failure cannot even be performed using known Sub Network Connection Protection (SNCP).

What is needed is an improved way of providing protection mechanisms to a communications network to provide a carrier class service and to reduce the above-mentioned problems.

SUMMARY

According to a first aspect of the invention, there is provided method of path protection in a communications network. The network comprises a protection hub in communication with a worker hub via a core protection path. The worker hub is in communication with at least one provider edge device via a respective worker path, and the protection hub is in communication with the at least one provider edge device via a respective protection path. The method includes the steps of;

detecting a failure in the communications network;
  indicating the failure in the communications network to at least one of the worker hub, the protection hub, and the at least one provider edge device;
  utilizing the core protection path to send traffic if there is a failure detected along the worker path; and
  utilizing the worker path and the protection path in parallel if there is a failure detected along the core protection path.

Such a method of providing path protection has the advantage that traffic can be protected in the case of multiple failures, such as when two or more failures occur between provider edge devices with one failure on the worker path and another failure on a protection path, or in the case of a single failure of the core protection path. The invention allows traffic to be routed between the worker and protection hub, or to use the worker and protection paths in the case of a failure. Such an arrangement is very advantageous in terms of network reliability. The protection schemes of the prior art are only resilient in the case of a single failure. Particularly, with prior art schemes, the connection between two provider edge devices may be lost if a second failure occurs. The present invention, however, provides a more robust way of providing protection to a communications network than prior art techniques.

Preferably, the method further includes using an Operation and Maintenance (OAM) message for detecting and/or indicating the failure.

Preferably, the OAM message includes at least one of (and perhaps two, three, or four of):

a Continuity Check (CC) message for checking connectivity of a path;
an Alarm Indication Signal (AIS) message for propagating a failure indication in the network;
a Remote Defect Indication (RDI) message for identifying an unidirectional link failure; and
a Missing Alignment indication (MAI) message for indicating a loss of connectivity between worker hub and the protection hub.

The method may further include copying traffic flow that is input to the provider edge device and passing one copy to the worker hub and another copy to the protection hub. The method may further include copying traffic flow input to the worker hub, and passing one copy to the protection hub and another copy to the communications network. Such a way of operating a network is applicable to 1+1 protection schemes.

The method may further including provisioning a copy of traffic flow input to the provider edge device and passing one copy to the worker hub. Another copy is passed to the protection hub upon detecting a failure. The method may further including provisioning a copy of the traffic flow input to the worker hub and passing one copy to the communications network, and another copy to the protection hub upon detecting a failure. Such a way of operating a network is applicable to 1:1 protection.

The method may further including receiving traffic flow at the provider edge device from the worker hub, and a copy of the traffic flow from the protection hub, and selecting which traffic flow to use.

According to another aspect of the invention there is provided a path protection system for a communications network comprising a protection hub in communication with a worker hub via a core protection path. The worker hub is in communication with at least one provider edge device via a respective worker path, while the protection hub is in communication with the at least one provider edge device via a respective protection path. The system is configured to:
detect a failure in the communications network;
indicate the failure in the communications network to at least one of the worker hub, the protection hub, and the at least one provider edge device;
utilize traffic flow on the core protection path if there is a failure detected along a worker path; and
utilize a worker path and a protection path in parallel if there is a failure detected along the core protection path.

Preferably, each of the provider edge devices is associated with a respective worker protection device of the worker hub.

Preferably, the worker protection device has a worker replicator configured to copy input traffic flow, and to pass one copy of the traffic flow to the protection hub and another copy onward for transmission in the communications network.

Preferably, the worker protection device has a respective worker selector configured to select one traffic flow from at least two input traffic flows.

Preferably, each of the provider equipment devices is associated with a respective backup protection device of the protection hub.

Preferably, the backup protection device has a respective protection replicator configured to copy input traffic flow, and to pass one copy of the traffic flow to the worker hub and another copy onward for transmission in the communications network.

Preferably, the backup protection device has a respective backup selector configured to select one traffic flow from at least two received input traffic flows.

Preferably, each provider edge device has a respective provider replicator configured to copy traffic flow that is input to the provider edge device, and to pass one copy of the traffic flow to the worker hub and another copy of the traffic flow to the protection hub.

Preferably, each provider edge device has a respective provider replicator configured to copy traffic flow that is input to the provider edge device, and to send one copy of the traffic flow to the worker hub and another copy of the traffic flow to the protection hub upon detecting the failure.

Preferably, the path protection system further includes a worker replicator configured to copy the traffic flow input to the worker hub, send one copy onward for transmission in the communications network, and send another copy to the protection hub upon detecting the failure.

Preferably, each provider edge device has a respective provider selector configured to receive traffic flow from the worker hub and a copy of the traffic flow from the protection hub. The edge device selector is configured to select which traffic flow to use.

The worker hub and/or the protection hub may be further provided with an Ethernet switch. A respective forward database of the Ethernet switch is updated in real time. Such real time updating reduces the possibility that traffic is lost in the event of a failure because the destination of the replicated traffic is always stored in a forward database of either the protection hub Ethernet switch or the worker hub Ethernet switch.

Preferably, the path protection system uses an Operation and Maintenance (OAM) message to detect and/or indicate the failure.

Preferably, the OAM message includes at least one of (and optionally two, three, or four of):
a Continuity Check (CC) message to check connectivity of a path;
an Alarm Indication Signal (AIS) message to propagate a failure indication in the network;
a Remote Defect Indication (RDI) message to identify an unidirectional link failure; and
a Missing Alignment indication (MAI) message to indicate a loss of connectivity between worker hub and the protection hub.

According to another embodiment of the invention, there is provided a first protection device for a communications network having first and second inputs for accepting communications traffic, and first and second outputs for outputting communications traffic. The first protection device also comprises a first replicator for producing first and second copies of a first flow of communications traffic received from the first input, and for sending the first copy of the first flow of communications traffic to the first output. The first protection device also comprises a first selector for receiving the second copy of the first flow of communications traffic from the first replicator, and a first copy of a second flow of communications traffic from the second input. The first selector is configured to send the first flow of communications traffic, or the first copy of the second flow of communications traffic, to the second output.

Preferably, the first protection device is in communication with a second protection device having third and fourth inputs for accepting communications traffic, and third and fourth outputs for outputting communications traffic. The first output is in communication with the fourth input and the third output is in communication with the second input. The second protection device further comprises a second replicator for producing the first and second copies of the second flow of communications traffic received from the third input. The second replicator is further configured to send the first copy of the second flow of communications traffic to the third output.

A first selector receives the second copy of the second flow of communications traffic from the second replicator and the first copy of the first flow of communications from the fourth input. The second selector is configured to send the first copy of the first flow of communications traffic, or the second copy of the second flow of communications traffic, to the fourth output.

According to another embodiment of the present invention, there is provided a worker hub of a communications network and further including a first protection device.

According to another embodiment of the present invention, there is provided a protection hub of a communications network and further including the second protection device.

According to another embodiment of the present invention, there is provided a communications network using the method, the path protection system, or the first or second protection devices of the invention.

BRIEF DESCRIPTION OF THE DRAWINGS

Other features of the invention will be apparent from the following description of preferred embodiments shown by way of example only with reference to the accompanying drawings, in which.

DETAILED DESCRIPTION

Figure 1:
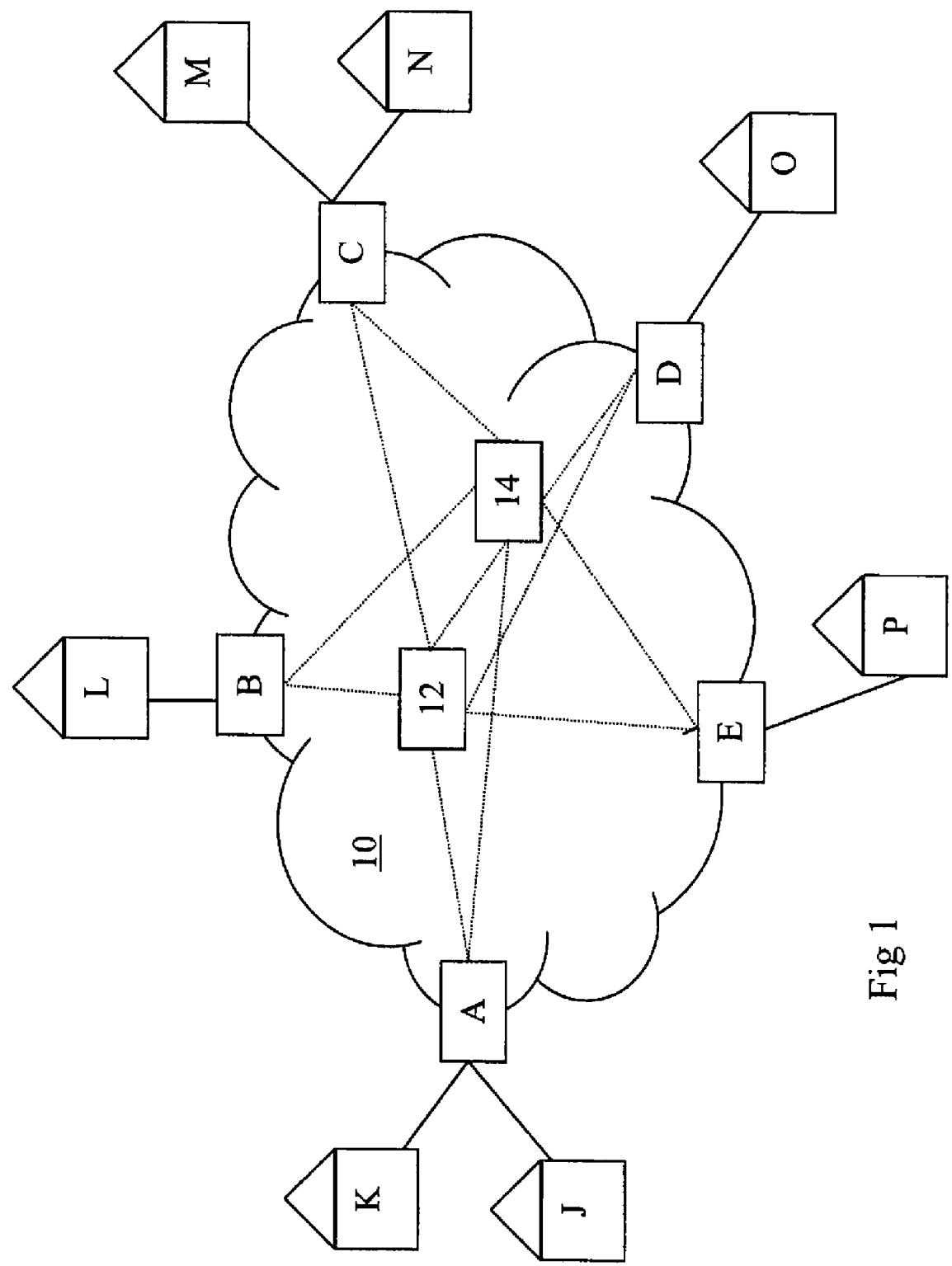
FIG. 1 shows a connection-oriented packet switched network.

FIG. 1 shows a connection-oriented packet switched network, generally designated 10, which is used as a reference network for presenting embodiments of the present invention. The network 10 has a worker hub 12 and a protection hub 14. The worker hub 12 and the protection hub 14 are each in communication with five provider edge devices A, B, C, D, E. The worker hub 12 and the protection hub 14 are also in communication with one another. The provider edge device A is in communication with two customer edge devices J, K. The provider edge device B is in communication with one customer edge device L. The provider edge device C is in communication with two customer edge devices M, N. The provider edge device D is in communication with one customer edge device O. The provider edge device E is in communication with one customer edge device P. The paths of communication in FIG. 1 are shown with solid lines. It will be appreciated that the paths between the provider edge devices A, B, C, D, E and either the worker hub 12 or the protection hub 14 may cross many additional network devices such as nodes of the network, which have been omitted for the purposes of clarity.

Figure 2:
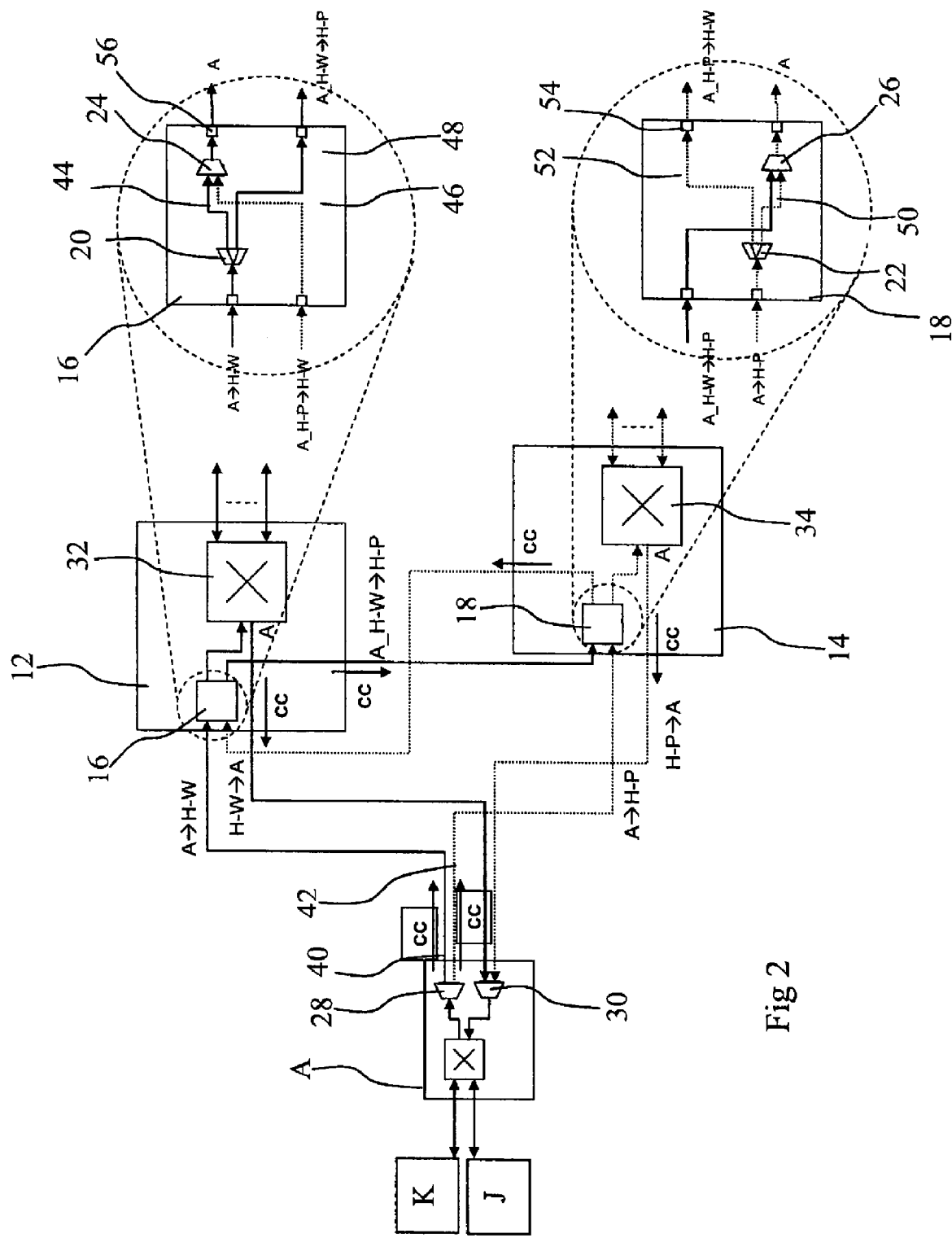
FIG. 2 shows traffic flow in a part of the network shown in FIG. 1 for 1+1 protection according to an embodiment of the invention.

The embodiments described herein will be presented for 1+1 and 1:1 protection. These terms take their normal meaning in the field of datacommunications. FIG. 2 shows the traffic flow in a part of the network shown in FIG. 1 for 1+1 protection according to an embodiment of the invention. In particular FIG. 2 shows the traffic flow between the customer edge devices J, K, the provider edge device A and the worker and protection hubs 12, 14. The worker hub 12 and the protection hub 14 are in communication with each other via a bidirectional core protection path. Each of the worker and protection hubs 12, 14 have a protection device 16, 18 which are shown in the magnified image in the circle on the right-hand side of FIG. 2. For the purposes of simplicity, only the protection devices 16, 18 are shown but it will be appreciated that in the real world implementation each provider edge device A, B, C, D, E would be associated with a respective protection device in the worker hub 12 and the protection hub 14. This principle is explained further with reference to FIG. 18.

In FIG. 2, each protection device 16, 18 has a respective replicator 20, 22 and a selector 24, 26. The provider edge device A also has a replicator 28 and a selector 30. Each replicator 20, 22, 28 operates to produce two identical traffic flows from one input traffic flow. Each selector 24, 26, 30 operates to select one traffic flow from two traffic flows that are input to it. Each of the worker and protection hubs 12, 14 are further provided with a known Ethernet switch 32, 34 which has a forward database according to known arrangements.

Notation is used in FIG. 2 which represents the traffic flow between the customer edge devices J, K, the provider edge device A and the worker and protection hubs 12, 14. For example, the notation A→H-W indicates the traffic flow from the provider edge device A to the worker hub 12. Similarly the notation A_H-W→H-P indicates the traffic flow from the worker hub 12 associated with the provider edge device A to the protection hub 14.

The worker and protection hubs 12, 14 communicate with each other using the known Operations, Administration and Maintenance (OAM) capabilities embedded within Ethernet. In the embodiment presented below notation is used which represents the following messages:

Continuity Check (CC) message to verify the status of a link or a node and to check connectivity.

Alarm Indication Signal (AIS) message to propagate a failure indication which can either be generic to a whole network or specific to a particular provider edge device.

Remote Defect Indication (RDI) message to identify a unidirectional link failure.

Missing Alignment Indication (MAI) message to declare loss of connectivity between working and protection Hub which applies only in the 1:1 protection mechanism.

Whereas the CC, AIS, and RDI messages are known from standard OAM messages in Ethernet, the MAI message is not known and represents a new command for operation of the network 10.

In FIG. 2, solid lines between network items indicate the worker path, whereas dotted lines indicate the protection path which carries a duplicate of the traffic on the worker path. This Figure shows the normal operation of the customer edge devices J, K, the provider edge device A and the worker and protection hubs 12, 14 without any failures present. Under such normal operation the traffic travels from the customer edge device K or J to the provider edge device A. The traffic is then split into two identical paths (or more identical paths if required but two identical paths is sufficient for the purposes of the present embodiment) by the replicator 28 of the provider edge device A. One of these paths is the worker path 40, and the other is the protection path 42. The traffic on the worker path 40 passes to the protection device 16 in the worker hub 12 which is indicated by the notation A→H-W. At the protection device 16, the traffic is split again into two identical paths (or more than two identical paths if required, but two identical paths is sufficient for the purposes of the present embodiment) by the replicator 20 of the protection device 16. The traffic on one of these paths 44 passes to the selector 24 of the protection device 16. The traffic on the other path 46 passes to an output 48 of the protection device 16 and then to the protection machine 18 of the protection hub 14. The traffic on path 46 is indicated by the notation A_H-W→H_P. In the protection machine 18, the traffic passes to the selector 26.

The traffic on the protection path 42 passes to the protection device 18 of the protection hub 14, which is indicated by the notation A→H-P. At the protection device 18 the traffic is split again into two identical paths (or more than two identical paths if required, but two identical paths is sufficient for the purposes of illustrating the present embodiment) by the replicator 22 of the protection device 18. The traffic on one of these paths 50 passes to the selector 26 of the protection device 18. The traffic on the other path 52 passes to an output 54 of the protection device 18 where it further passes to the protection machine 16 of the worker hub 12, which is indicated by the notation A_H-P→H-W. In the protection machine 16 the traffic passes to the selector 24.

Under normal operation and without any fault present, the selector 24 of the worker hub protection device 16 selects the traffic from the path 44 and passes it to an output 56 of the protection device 16. The traffic is then passed to the Ethernet switch 32 for onward transmission throughout the network 10. Traffic received at the Ethernet switch 32, which is destined for the customer edge devices J, K, is sent from the Ethernet switch 32 to the selector 30 of the provider edge device A along a worker path indicated by the notation H-W→A. Similarly, traffic received at the Ethernet switch 34 of the protection hub 14, which is destined for the customer edge devices J, K, is sent from the Ethernet switch 34 to the selector 30 of the provider edge device A along a protection path indicated by the notation H-P→A. Under normal operation and without any fault present, the selector 30 chooses the worker traffic flow from the Ethernet switch 32 and passes it to customer edge device J, K as necessary.

FIG. 2 further shows Continuity Check (CC) messages that are sent between the various items of equipment to check the continuity of the various paths using the OAM function embedded within Ethernet. One CC message is shown passing between the replicator 28 of the provider edge device A and the protection device 16 of the worker hub 12. Another CC message is shown passing between the Ethernet switch 32 of the worker hub 12 and the selector 30 of the provider edge equipment A. Another CC message is shown passing between the protection device 16 of the worker hub 12 and the protection device 18 of the protection hub 14. Another CC message is shown passing between the protection device 18 of the protection hub 14 and the protection device 16 of the worker hub 12. Another CC message is shown passing between the replicator 28 of the provider edge device A and the protection device 18 of the protection hub 14. Another CC message is shown passing between the Ethernet switch 34 of the protection hub 14 and the selector 30 of the provider edge equipment A. The CC messages are used to check connectivity and thereby detect failures in the traffic flow of the worker or protection paths, or in the communication paths between the worker hub 12 and the protection hub 14. Such CC messages are sent on a predetermined periodic basis.

Figure 3:
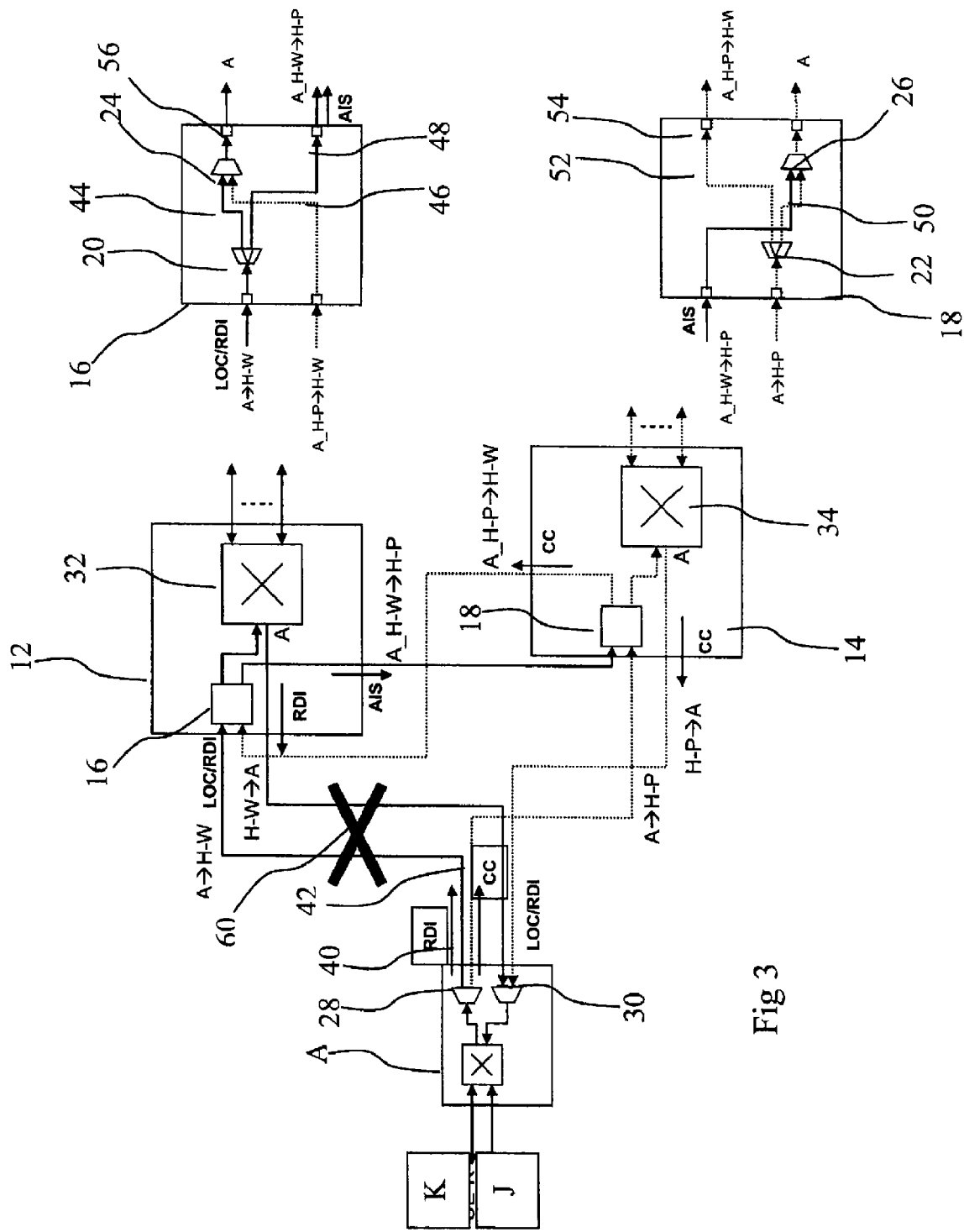
FIGS. 3-5 show diagrammatic representations of a failure in a communication path in the part of the network shown in FIG. 2.

FIG. 3 is a diagrammatic representation showing a failure in a communication path. In particular, FIG. 3 shows a failure 60 of the paths between the provider edge equipment A and the worker hub 12, and how the protection mechanism operates to take advantage of the 1+1 protection. In the failure scenario of FIG. 3, the path between the protection device 16 of the worker hub 12 and the replicator 28 of the provider edge device A, and the path between the Ethernet switch 32 of the worker hub 12 and the selector 30 of the provider edge device A, have both failed. In this scenario, the CC message from the replicator 28 of the provider edge device A to the protection device 16 of the worker hub 12 is sent but not received. The CC message from the Ethernet switch 32 of the worker hub 12 to the selector 30 of the provider edge device A is also sent but not received. The worker hub 12 detects that there is a failure because there is a loss of connectivity and sends an RDI message to the provider edge equipment A. Similarly, the provider edge equipment A detects that there is a failure because there is a loss of connectivity and sends an RDI message to the worker hub 12. However, since the paths between the provider edge device A and the worker hub 12 have failed these RDI messages are not received.

After the failure has been detected, the worker hub 12 sends an AIS message from the protection device 16 to the protection device 18 of the protection hub 14. The AIS message is used by the worker hub 12 to inform the protection hub 14 of a failure of connectivity between the provider edge device A and the worker hub 12. The AIS message propagates a failure indication and informs the protection hub 14 that the worker hub 12 is now using the copy of traffic from the protection hub 14. In effect the AIS message activates use of the replicated traffic from the protection machine 18 of the protection hub 14.

Traffic from the customer edge device K or J now flows to the provider edge device A, and on to the protection machine 18 of the protection hub 14. Upon receipt, the replicator 22 of the protection device 18 sends one copy of the traffic to the switch 34 of the protection hub 14 for onward transmission in the network 10, and another copy of the traffic to the selector 24 of the protection device 16 of the worker hub 12. The selector 24 then chooses which flow of traffic to send to the switch 32 of the worker hub 12 for onward transmission in the network 10. Since the path between the worker hub 12 and the provider edge equipment A has failed, the traffic from the switch 32 of the worker hub 12 is not sent to the provider edge device A. Instead traffic destined for the provider edge equipment A is sent from the switch 34 of the protection hub 14. It will be appreciated that the switch 32 of the worker hub 12 can still be used to send traffic onward through the network 10 should there be a failure with the switch 34 of the protection hub 14.

The protection mechanism described with reference to FIG. 3 can also operate in the case of an unidirectional failure, such as when only the path from the worker hub 12 to the provider edge device A fails, for example. In this scenario, only the path between the Ethernet switch 32 of the worker hub 12 and the selector 30 has failed. The CC message from the switch 32 of the worker hub 12 to the selector 30 of the provider edge device A is sent but not received by the selector 30 of the provider edge device A. This indicates a loss of connectivity. In response, the provider edge device A sends an RDI message to the protection device 16 of the worker hub 12. The worker hub 12 detects that there is a failure by receipt of this RDI message and sends an AIS message from the protection device 16 of the worker hub 12 to the protection device 18 of the protection hub 14. The AIS message propagates a failure indication and informs the protection hub 14 that the worker hub 12 is now using the copy of traffic from the protection hub 14. The AIS message activates use of the replicated traffic from the protection machine 18 of the protection hub 14.

Similarly, the protection mechanism outlined with respect to FIG. 3 also operates in situations where only the path from the provider edge device A to the worker hub 12 fails. In this scenario, the CC message from the replicator 28 of the provider edge device A to the protection device 16 of the worker hub 12 is sent but not received thereby indicating a loss of connectivity. In response, the Ethernet switch 32 of the worker hub 12 sends an RDI message to the selector 30 of the provider edge device A. The worker hub 12 detects that there is a failure and sends an AIS message from the protection device 16 of the worker hub 12 to the protection device 18 of the protection hub 14. The AIS message propagates a failure indication and informs the protection hub 14 that the worker hub 12 is now using the copy of traffic from the protection hub 14. The AIS message activates use of the replicated traffic from the protection machine 18 of the protection hub 14.

Figure 4:
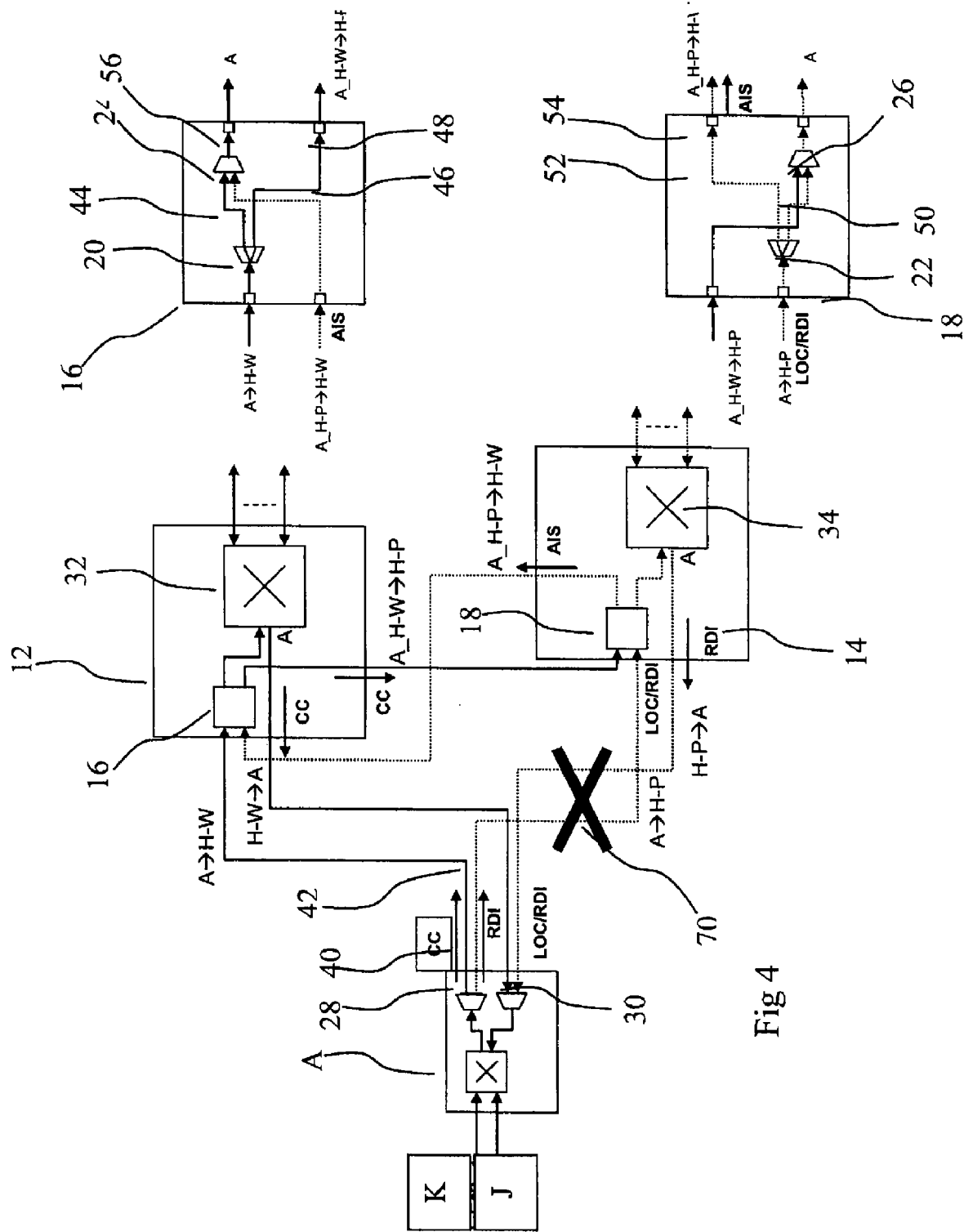

FIG. 4 is a diagrammatic representation showing a failure 70 along the paths between the provider edge equipment A and the protection hub 14, and how the protection mechanism operates in response. In the failure scenario of FIG. 4, the path between the protection device 18 of the protection hub 14 and the replicator 28 of the provider edge device A, and the path between the Ethernet switch 34 of the protection hub 14 and the selector 30 of the provider edge device A, have both failed. In this scenario, the CC message from the protection device 18 of the protection hub 14 to the replicator 28 of the provider edge device A is sent but not received. The CC message between the Ethernet switch 34 of the protection hub 14 and the selector 30 of the provider edge device A is also sent but not received. The protection hub 14 detects that there is a failure because there is a loss of connectivity and sends an RDI message to the provider edge equipment A. Similarly, the provider edge equipment A detects that there is a failure because there is a loss of connectivity and sends an RDI message to the protection hub 14. However, since the paths between the provider edge device A and the protection hub 14 have failed, these RDI messages are not received.

After the failure has been detected, the protection hub 14 sends an AIS message from the protection device 18 to the protection device 16 of the worker hub 12. The AIS message is used by the protection hub 14 to inform the worker hub 12 of a failure of connectivity between the provider edge device A and the protection hub 14. The AIS message propagates a failure indication and informs the worker hub 12 that it cannot use the copy of traffic from the protection hub 14.

Traffic from the customer edge device K or J flows to the provider edge device A and on to the worker hub 12. It will be appreciated that the switch 34 of the protection hub 14 can still be used for sending traffic onward through the network 10 should there be a failure with the switch 32 of the worker hub 12.

The protection mechanism described with reference to FIG. 4 can also operate in the case of an unidirectional failure, such as when only the path from the protection hub 14 and the provider edge device A fails, for example. In this scenario, only the path between the switch 34 of the protection hub 14 and the selector 30 has failed. The CC message from the switch 34 of the protection hub 14 to the selector 30 of the provider edge device A is sent but not received by the selector 30 of the provider edge device A, thereby indicating a loss of connectivity. In response, the provider edge device A sends an RDI message to the protection device 18 of the protection hub 14. The protection hub 14 detects that there is a failure upon receiving this RDI message, and an AIS message is sent from the protection device 18 of the protection hub 14 to the protection device 16 of the worker hub 12. The AIS message propagates the failure indication and informs the worker hub 12 that it cannot send traffic from the protection hub 14 to the provider edge device A.

Similarly, the protection mechanism outlined with respect to FIG. 4 also operates in situations where only the path between the provider edge device A and the protection hub 14 fails. In this scenario, the CC message from the replicator 28 of the provider edge device A to the protection device 18 of the protection hub 14 is sent but not received by the replicator 28. This indicates a loss of connectivity. In response, the protection hub 14 sends an RDI message to the selector 30 of the provider edge device A. The protection hub 14 detects that there is a failure and sends an AIS message from the protection device 18 of the protection hub 14 to the protection device 16 of the worker hub 12. The AIS message propagates the failure indication and informs the worker hub 12 that it cannot use the copy of traffic from the protection hub 14.

Figure 5:
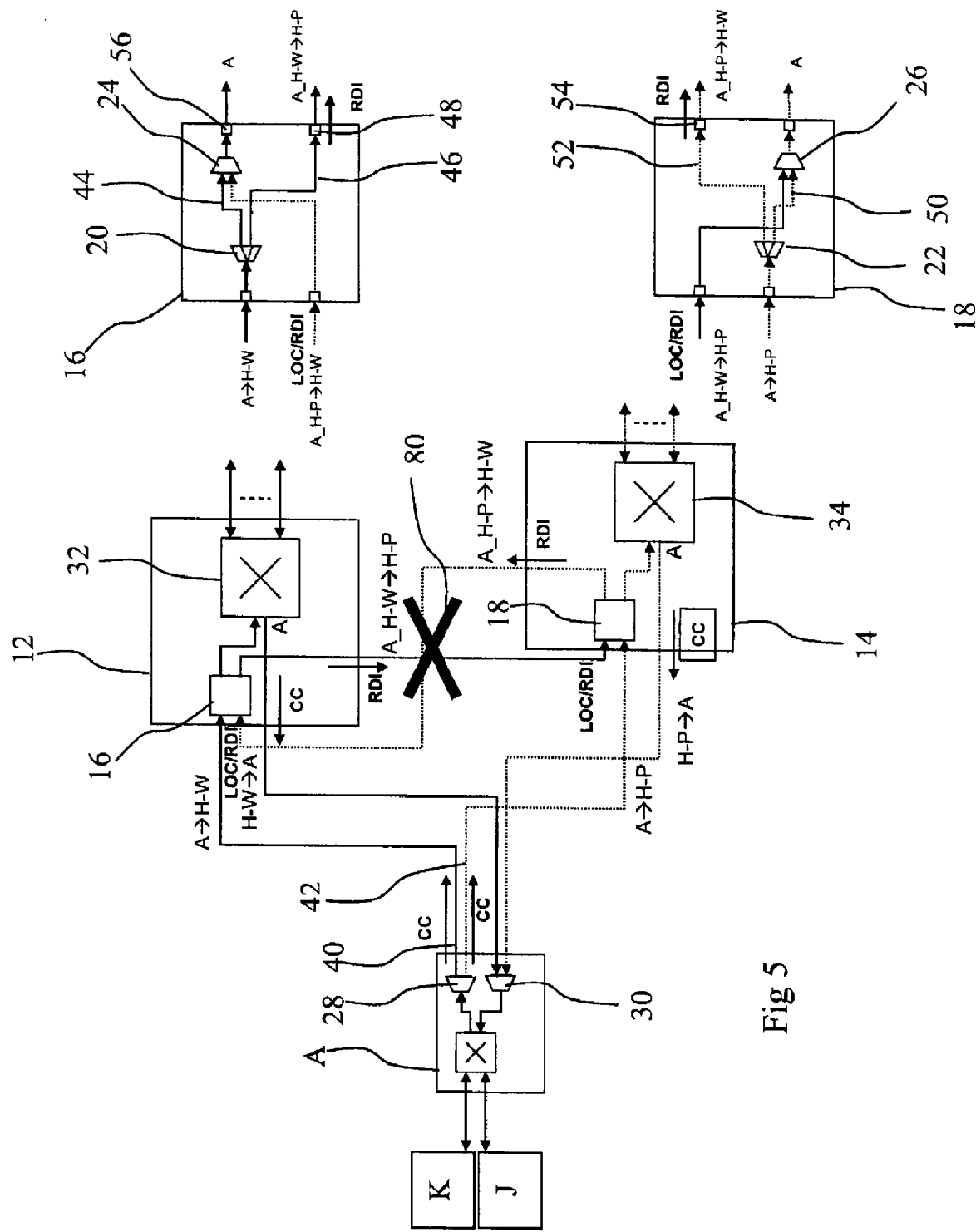

FIG. 5 is a diagrammatic representation showing a failure 80 of the paths between the worker hub 12 and the protection hub 14, and how the protection mechanism operates. In the failure scenario of FIG. 5, the paths between the protection device 18 of the protection hub 14 and the protection device 16 of the worker hub 12 have failed. The CC messages between the protection device 18 of the protection hub 14 and the protection device 16 of the worker hub 12 are sent but not received. The worker hub 12 and the protection hub 14 detect that there is a failure because there is a loss of connectivity between them. In response to the detected failure, the worker hub 12 sends an RDI message to the protection hub 14, which in turn, sends an RDI message to the worker hub 12. However, since the paths between the worker hub 12 and the protection hub 14 have failed these RDI messages are not received. Each hub 12, 14 then operates as if the other hub 12, 14 is not operating, and the decision on which traffic flow to use is made by the provider edge device A.

If the provider edge device A decides to use the protection hub 14, the traffic from the customer edge device K or J is output to the provider edge device A. Then, the traffic is output to the protection device 18 of the protection hub 14 where the replicator 22 of the protection device 18 sends a copy of the traffic to the switch 34 of the protection hub 14 for onward transmission in the network 10. Since the path between the worker hub 12 and the protection hub 14 has failed, a copy of the traffic from the replicator 22 is not sent to the worker hub 12. Traffic destined for the provider edge device A is sent from the switch 34 of the protection hub 14.

If the provider edge device A decides to use the worker hub 12, the traffic from the customer edge device K or J is output to the provider edge device A, and then to the protection device 16 of the worker hub 12. Upon receipt, the replicator 20 of the protection device 16 sends a copy of the traffic to the switch 32 of the worker hub 12 for onward transmission in the network 10. Since the path between the worker hub 12 and the protection hub 14 has failed, a copy of the traffic from the replicator 20 is not sent to the protection hub 14. Traffic destined for the provider edge equipment A is sent from the switch 32 of the worker hub 14.

The protection mechanism described with reference to FIG. 5 can also operate in the case of an unidirectional failure, such as when only the path from the worker hub 12 to the protection hub 14 fails, for example. In this scenario, only the path between the replicator 20 of the worker hub 12 and the selector 26 of the protection hub 14 has failed. The CC message from the replicator 20 of the worker hub 12 to the selector 26 of the protection hub 14 is sent but not received by the selector 26. This indicates a loss of connectivity. In response, the protection device 16 sends an RDI message to the protection device 18 of the protection hub 14, which is also not received. The worker hub 12 now knows that it cannot copy traffic to the protection hub 14, but that it can receive traffic from the protection hub 14 that was copied by the provider edge device A.

Similarly, the protection mechanism outlined with respect to FIG. 5 also operates in situations where only the path from the protection hub 14 to the worker hub 12 fails. In this scenario, only the path between the replicator 22 of the protection hub 14 and the selector 24 of the worker hub 12 has failed. The CC message from the replicator 22 of the protection hub 14 to the selector 24 of the worker hub 12 is sent but not received by the selector 2, thereby indicating a loss of connectivity. In response, the protection device 18 sends an RDI message to the protection device 16 of the worker hub 12, which is also not received. The protection hub 14 now knows that it cannot send traffic to the worker hub 12, but that it can receive traffic from the worker hub 12 that was copied by the provider edge device A.

Figure 6:
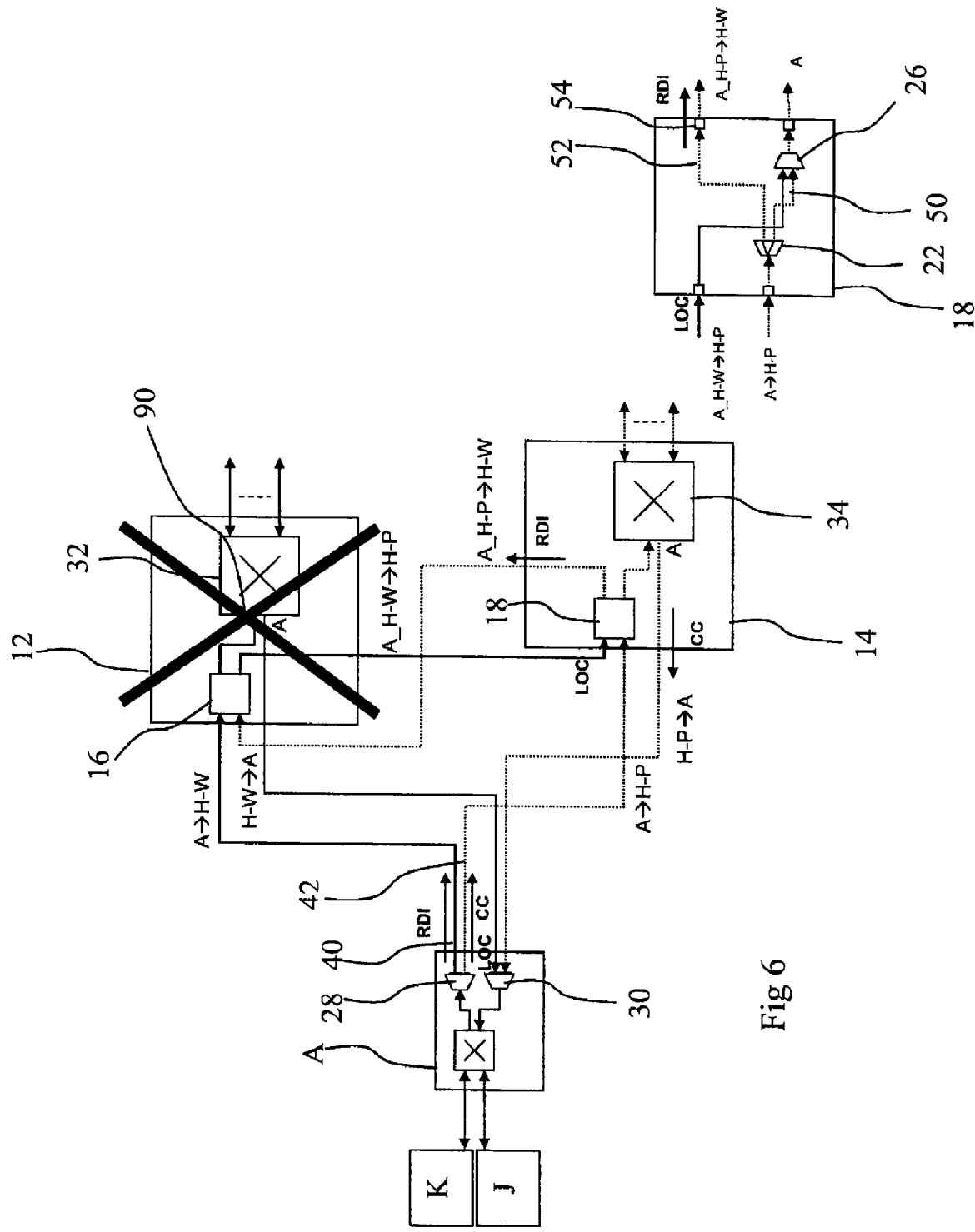
FIGS. 6 & 7 show diagrammatic representation of a failure of the worker hub and protection hub respectively in the part of the network shown in FIG. 2.

FIG. 6 shows a diagrammatic representation of a failure 90 of the worker hub 12 in a part of the network shown in FIG. 2, and how the protection mechanism operates to take advantage of the 1+1 protection. In the failure scenario of FIG. 6, the paths between the worker hub 12 and the provider edge device A, and the paths between the worker hub 12 and the protection hub 14, have all failed. In this scenario, the CC messages between the protection device 16 of the worker hub 12 and the protection device 18 of the protection hub 14 have been sent but not received. The CC messages from the Ethernet switch 32 of the worker hub 12 to the selector 30 of the provider edge device A, and from the replicator 28 to the protection machine 16 of the worker hub 12, have also been sent but not received. The protection hub 14 detects that there is a failure because there is a loss of connectivity with the worker hub 12, and sends an RDI message from the protection machine 18 to the worker hub 12. Similarly the provider edge equipment A detects that there is a failure because there is a loss of connectivity, and sends an RDI message from the replicator 28 to the protection machine 16 of the worker hub 12. However, since the worker hub 12 has failed these RDI messages are not received.

After the failure has been detected, the protection hub 14 takes over and uses the copy of traffic at the protection hub 14. In effect, the failure activates use of the replicated traffic at the protection hub 14. Traffic from the customer edge device K or J now flows to the provider edge device A, and then to the protection device 18 of the protection hub 14. The selector 26 of the protection device 18 chooses the copy of the traffic from the provider edge device A to be passed on to the switch 34 of the protection hub 14 for onward transmission in the network 10.

Figure 7:
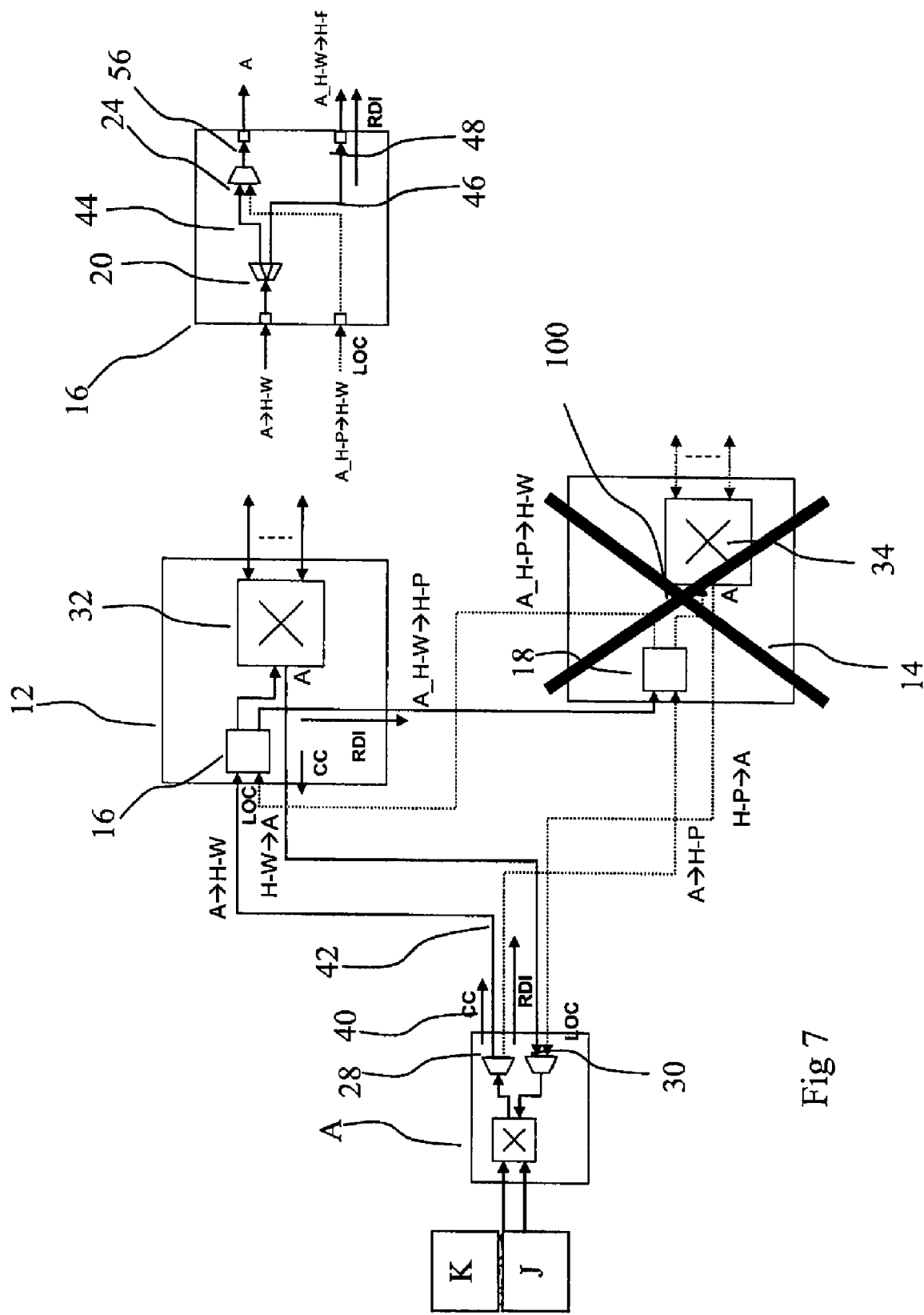

FIG. 7 shows a diagrammatic representation of a failure 100 of the protection hub in a part of the network shown in FIG. 2, and how the protection mechanism operates to take advantage of the 1+1 protection. In the failure scenario of FIG. 7, the paths between the protection hub 14 and the provider edge device A, and the paths between the worker hub 12 and the protection hub 14, have all failed. In this scenario, the CC messages between the protection device 16 of the worker hub 12 and the protection device 18 of the protection hub 14 have been sent but not received. The CC messages from the Ethernet switch 34 of the protection hub 14 to the selector 30 of the provider edge device A, and from the replicator 28 to the protection machine 18 of the protection hub 14, have also been sent but not received. The worker hub 12 detects that there is a failure because there is a loss of connectivity with protection hub 14, and sends an RDI message from the protection machine 16 to protection hub 14. Similarly the provider edge equipment A detects that there is a failure because there is a loss of connectivity, and sends an RDI message from the replicator 28 to the protection machine 18 of protection hub 14. However, since the protection hub 14 has failed these RDI messages are not received.

After the failure has been detected, the worker hub 12 knows that it cannot use the copy of the traffic form the protection hub 14. Traffic from the customer edge device K or J continues to flow to the provider edge device A, and on to the protection device 16 of the worker hub 12. The selector 24 of the protection device 16 chooses the traffic from the provider edge device A to be passed on to the switch 32 of the worker hub 12 for onward transmission in the network 10.

Figure 8:
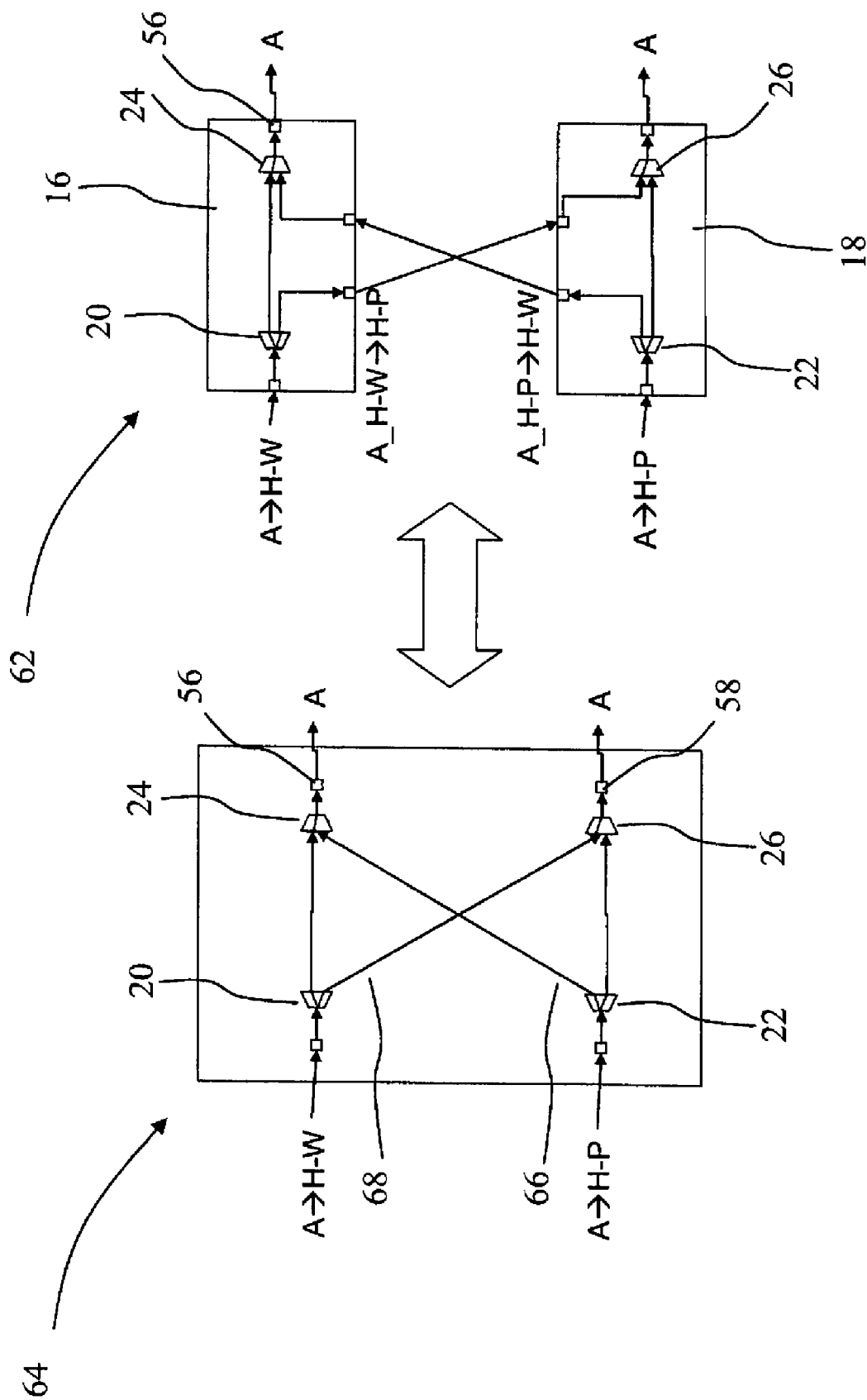
FIG. 8 is a diagram representing a compound function of the protection devices shown in FIGS. 2-7.

FIG. 8 is a diagram representing a compound function of the protection devices 16 and 18 shown in FIGS. 2-7. On the right hand side of FIG. 8, the protection devices 16 and 18 are shown in communication with one another at 62. The compound function of the two protection devices 16 and 18 is shown at 64. This compound function shows that the protection devices 16, 18 can be conceptually thought of as operating together to provide protection to the network 10. Whereas each protection device 16, 18 can operate alone, such as when only one of devices 16, 18 has failed, they also operate together. The compound function provides two copies of the selected ingress traffic flow, illustrated at 66, 68, on the two egress points 56, 58 of the protection devices 16, 18.

The protection mechanism described with reference to FIGS. 1-8 also allows the use of management commands such as "Manual", "Forced", "Lockout" and "Clear." These commands are commonly used with known techniques of protection mechanisms and are described in ITU-T G.808.1, section 19. Such management commands are used for maintenance purposes once a failure has occurred and an item of hardware or software is being fixed or updated.

It will be appreciated that the protection mechanism described with reference to FIGS. 1-8 also allows for real time updating of the forward databases of the Ethernet switches 32, 34. Such real time updating reduces the possibility that traffic is lost in the event of a failure because the destination of the replicated traffic is always stored in a forward database of either of the Ethernet switches 32, 34.

Figure 9:
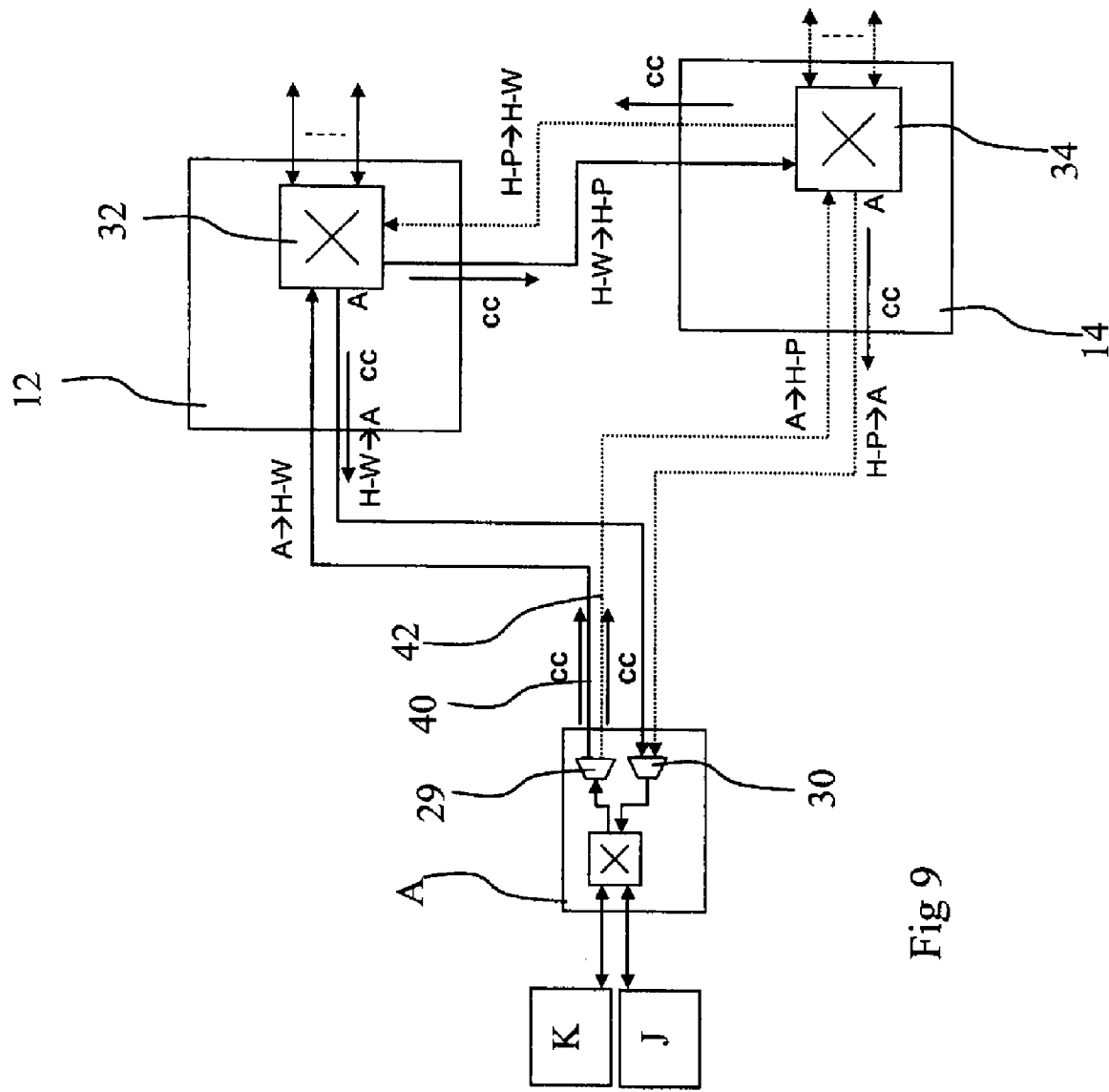
FIG. 9 shows traffic flow in a part of the network shown in FIG. 1 for 1:1 protection according to an embodiment of the invention.

FIG. 9 shows traffic flow in a part of the network shown in FIG. 1 for 1:1 protection according to an embodiment of the invention. In FIG. 9, features that are similar to those shown in the embodiment of FIG. 2 are shown with like reference numerals. In particular, FIG. 9 shows the traffic flow between the customer edge devices J, K, the provider edge device A, and the worker and protection hubs 12, 14. In this embodiment, the worker and protection hubs 12, 14 do not have a protection device and are provided with a respective Ethernet switch 32, 34, each of which have a forward database according to known arrangements. The provider edge device A has a provider switch 29 and a selector 30.

The notation used in FIG. 9 A→H-P and H-P→A between the provider edge device A and the protection hub 14, and the notation H-W→H-P and H-P→H-W between the worker hub 12 and the protection hub 14 indicates a flow of OAM messages only and that there is no flow of traffic under normal operating conditions and without any failure present.

In FIG. 9, solid lines between network items indicate the worker path, whereas dotted lines indicate the protection path, which is a provisioned path that does not carry traffic until it is required to do so. This Figure shows the normal operation of the customer edge devices J, K, the provider edge device A, and the worker and protection hubs 12, 14, without any failures present. Under such normal operation, the traffic travels from the customer edge device K or J to the provider edge device A. The traffic is then sent by the provider switch 29 to the Ethernet switch 32 of the worker hub 12 for onward transmission in the network 10. Incoming traffic to the Ethernet switch 32 from the network 10 is sent to the selector 30 of the provider edge device A for onward transmission to the customer edge devices K, J. Under normal operation and without any fault present, the traffic from the worker hub 12 is selected by the selector 30 of the provider edge device A. Bidirectional communication paths are provisioned between the worker hub 12 and the protection hub 14. Bidirectional communication paths are also provisioned between the provider edge device A and the protection hub 14.

FIG. 9 further shows CC messages that are sent between the various items of equipment to check the continuity of the various paths using the OAM function embedded within Ethernet. One CC message is shown passing between the provider switch 29 of the provider edge device A and Ethernet switch 32 of the worker hub 12. Another CC message is shown passing between the Ethernet switch 32 of the worker hub 12 and the selector 30 of the provider edge equipment A. Another CC message is shown passing between the Ethernet switch 32 of the worker hub 12 and the Ethernet switch 34 of the protection hub 14. Another CC message is shown passing between the Ethernet switch 34 of the protection hub 14 and the Ethernet switch 32 of the worker hub 12. Another CC message is shown passing between the provider switch 29 of the provider edge device A and Ethernet switch 34 of the protection hub 14. Another CC message is shown passing between the Ethernet switch 34 of the protection hub 14 and the selector 30 of the provider edge equipment A. The CC messages are used to check connectivity and thereby detect failures in worker or protection path and are sent on a predetermined periodic basis.

Figure 10:
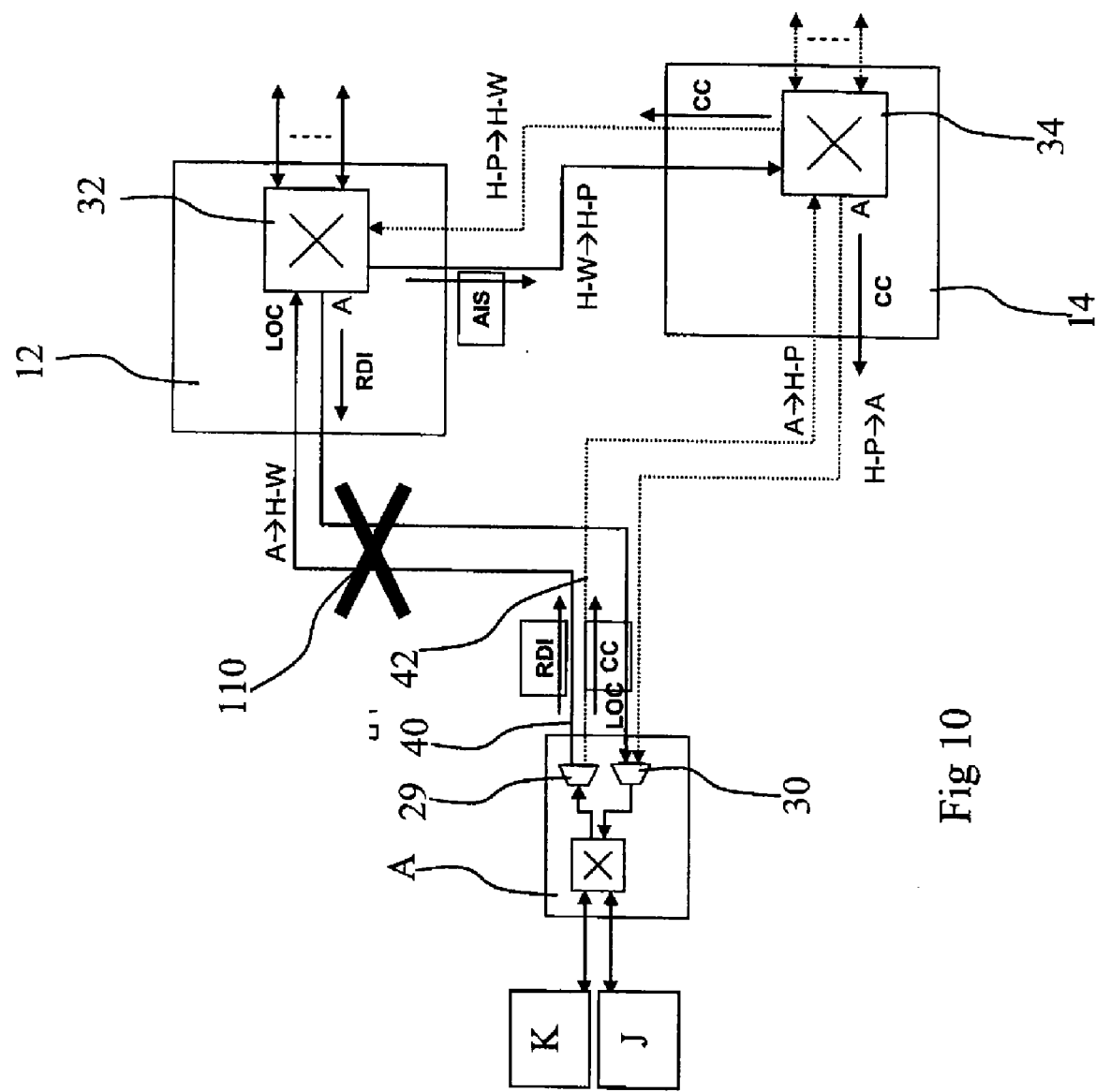
FIGS. 10-16 show diagrammatic representations of a failure in a communication path in the part of the network shown in FIG. 9.

FIG. 10 is a diagrammatic representation of a failure in a communication path in the part of the network shown in the embodiment of FIG. 9. In particular, FIG. 10 shows a failure 110 along the paths between the provider edge equipment A and the worker hub 12, and how the protection mechanism operates to take advantage of the 1:1 protection. In the failure scenario of FIG. 10, the path between the Ethernet switch 32 of the worker hub 12 and the provider switch 29 of the provider edge device A, and the path between the Ethernet switch 32 of the worker hub 12 and the selector 30 of the provider edge device A, have both failed. In this scenario, the CC message from provider switch 29 of the provider edge device A to the Ethernet switch 32 of the worker hub 12 is sent but not received. The CC message from the Ethernet switch 32 of the worker hub 12 to the selector 30 of the provider edge device A is also sent but not received. The worker hub 12 detects that there is a failure because there is a loss of connectivity and sends an RDI message to the provider edge equipment A. Similarly, the provider edge equipment A detects that there is a failure because there is a loss of connectivity and sends an RDI message to the worker hub 12. However, since the paths between the provider edge device A and the worker hub 12 have failed, these RDI messages are not received.

After the failure has been detected, the worker hub 12 sends an AIS message from the Ethernet switch 32 to the Ethernet switch 34 of the protection hub 14. The AIS message is used by the worker hub 12 to inform the protection hub 14 of a failure of connectivity between the provider edge device A and the worker hub 12. The AIS message propagates a failure indication and informs the protection hub 14 that the worker hub 12 is now going to use a copy of traffic from the provisioned path. In effect, the AIS message activates use of the provisioned path from the provider switch 29 to the Ethernet switch 34 of the protection hub 14.

Traffic from the customer edge device K or J then flows to the provider edge device A, and on to the Ethernet switch 34 of the protection hub 14 for onward transmission in the network 10. Since the path between the worker hub 12 and the provider edge equipment A has failed, the traffic from the switch 32 of the worker hub 12 is not sent to the provider edge device A. Instead, traffic destined for the provider edge equipment A is sent from the switch 34 of the protection hub 14. It will be appreciated that the switch 32 of the worker hub 12 can still be used to send traffic onward through the network 10 should there be a failure with the switch 34 of the protection hub 14.

The protection mechanism described with reference to FIG. 10 can also operate in the case of an unidirectional failure, such as when only the path from the worker hub 12 to the provider edge device A fails, for example. In this scenario, only the path between the Ethernet switch 32 of the worker hub 12 and the selector 30 has failed. The CC message from the switch 32 of the worker hub 12 to the selector 30 of the provider edge device A is sent but not received by the selector 30 of the provider edge device A. This indicates a loss of connectivity. In response, the provider edge device A sends an RDI message to the Ethernet switch of the worker hub 12. The worker hub 12 detects that there is a failure upon receiving this RDI message, and sends an AIS message to the Ethernet switch 34 of the protection hub 14. The AIS message propagates the failure indication and informs the protection hub 14 that the worker hub 12 is now going to send traffic to it on the provisioned path for onward transmission to the provider edge device A. In effect the AIS message activates use of the provisioned path from the Ethernet switch 32 of the worker hub 12 to the Ethernet switch 34 of the protection hub 14.

Similarly, the protection mechanism outlined with respect to FIG. 10 also operates in cases where only the path from the provider switch 29 of the provider edge device A to the Ethernet switch 32 of the worker hub 12 fails. In this scenario, the CC message from the provider switch 29 to the Ethernet switch 32 of the worker hub 12 is sent but not received, thereby indicating a loss of connectivity. In response, the Ethernet switch 32 of the worker hub 12 sends an RDI message to the selector 30 of the provider edge device A. The worker hub 12 detects that there is a failure and sends an AIS message from the Ethernet switch 32 of the worker hub 12 to the Ethernet switch 34 of the protection hub 14. The AIS message propagates the failure indication and informs the protection hub 14 that the worker hub 12 is now going to receive traffic from it on the provisioned path for onward transmission to the network 10. In effect, the AIS message activates use of the provisioned path from the provider switch 29 to the Ethernet switch 34 of the protection hub 14 to the Ethernet switch 34 of the worker hub 12.

Figure 11:
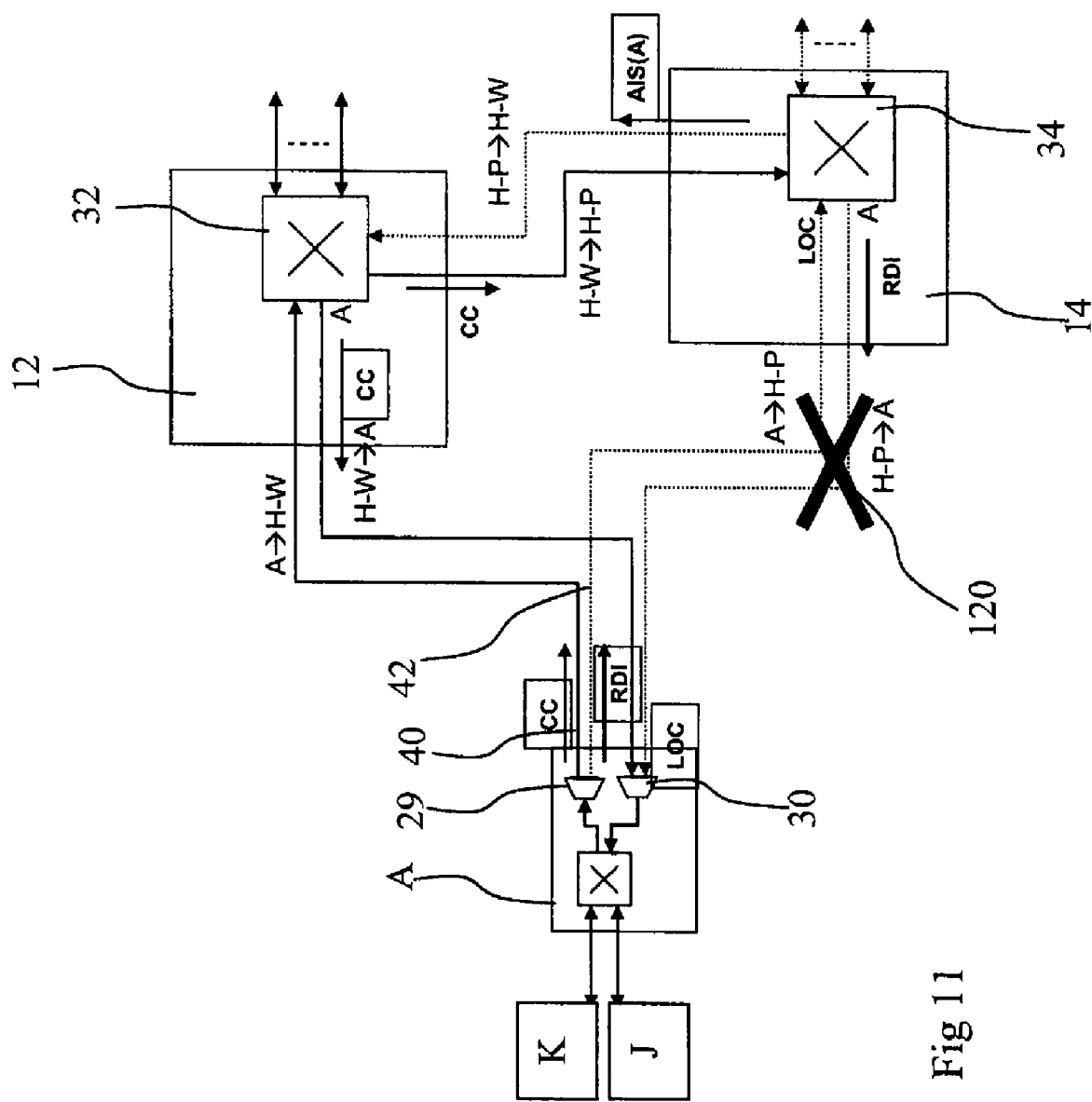

FIG. 11 is diagrammatic representation showing a failure 120 along the paths between the provider edge equipment A and the protection hub 14, and how the protection mechanism operates in response. In the failure scenario of FIG. 11, the path between the provider switch 29 of the provider edge device A and the Ethernet switch 34 of the protection hub 14, and the path between the Ethernet switch 34 of the protection hub 14 and the selector 30 of the provider edge device A, have both failed. In this scenario, the CC message from the Ethernet switch 34 of the protection hub 14 to the replicator 30 of the provider edge device A is sent but not received. The CC message from the provider switch 29 of the provider edge device A to the Ethernet switch 34 of the protection hub 14 is also sent but not received. The protection hub 14 detects that there is a failure because there is a loss of connectivity, and sends an RDI message to the provider edge equipment A. Similarly, the provider edge equipment A detects that there is a failure because there is a loss of connectivity and sends an RDI message to the protection hub 14. However, since the paths between the provider edge device A and the protection hub 14 have failed, these RDI messages are not received.

After the failure has been detected, the protection hub 14 sends an AIS message from the Ethernet switch 34 to the Ethernet switch 32 of the worker hub 12. The AIS message is used by the protection hub 14 to inform the worker hub 12 of a failure in connectivity between the provider edge device A and the provider hub 14. The AIS message propagates the failure indication and informs the protection worker hub 12 that the protection hub 14 cannot use a copy of traffic from the provisioned path.

Traffic from the customer edge device K or J then flows to the provider edge device A and on to the worker hub 12. It will be appreciated that the switch 34 of the protection hub 14 can still be used for sending traffic onward through the network 10 should there be a failure of the switch 32 of the worker hub 12.

The protection mechanism described with reference to FIG. 11 can also operate in the case of an unidirectional failure, such as when only the path from the protection hub 14 to the provider edge device A fails, for example. In this scenario, only the path between the Ethernet switch 34 of the protection hub 14 and the selector 30 of the provider edge device A has failed. The CC message from the switch 34 of the protection hub 14 to the selector 30 of the provider edge device A is sent but not received, which indicates a loss of connectivity. In response the provider edge device A sends an RDI message to the Ethernet switch 34 of the protection hub 14. The protection hub 14 detects that there is a failure by receipt of this RDI message, and sends an AIS message from the Ethernet switch 34 to the Ethernet switch 32 of the worker hub 12. The AIS message propagates the failure indication and informs the worker hub 12 that it cannot send traffic from the protection hub 14 to the provider edge device A.

Similarly, the protection mechanism outlined with respect to FIG. 11 also operates in situations where only the path between the provider edge device A and the protection hub 14 fails. In this scenario, the CC message from the provider switch 29 of the provider edge device A to the Ethernet switch 34 of the protection hub 14 is sent but not received, thereby indicating a loss of connectivity. In response, the Ethernet switch 34 sends an RDI message to the selector 30 of the provider edge device A. The protection hub 14 detects that there is a failure and sends an AIS message from the Ethernet switch 34 of the protection hub 14 to the Ethernet switch 32 of the worker hub 12. The AIS message propagates a failure indication and informs the worker hub 12 that it cannot use the copy of traffic from the protection hub 14.

Figure 12:
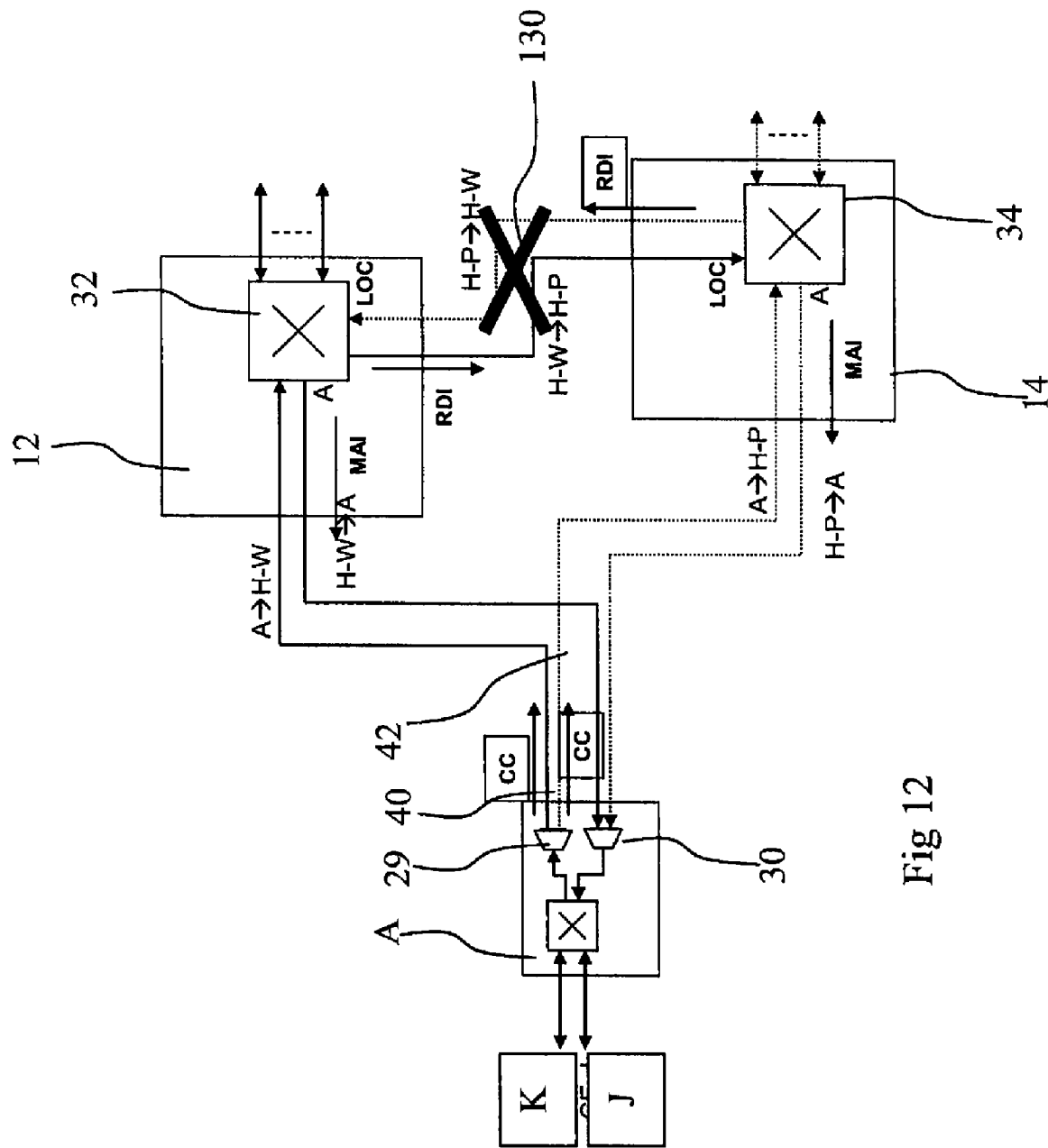

FIG. 12 is a diagrammatic representation showing a failure 130 along the paths between the worker hub 12 and the protection hub 14, and how the protection mechanism operates. In the failure scenario of FIG. 12, the paths between the Ethernet switch 34 of the protection hub 14 and Ethernet switch 32 of the worker hub 12 have failed. The CC messages between the Ethernet switch 34 of the protection hub 14 and the Ethernet switch 32 of the worker hub 12 are sent but not received. The worker hub 12 and the protection hub 14 detect that there is a failure because there is a loss of connectivity between them. In response to the detected failure, the worker hub 12 sends an RDI message to the protection hub 14, and the protection hub 14 sends an RDI message to the worker hub 12. However, since the paths between the worker hub 12 and the protection hub 14 have failed, these RDI messages are not received. Each Ethernet switch 32, 34 then sends an MAI message to the provider edge device A to inform the provider edge device A that there is a loss of connectivity between the worker hub 12 and the protection hub 14. In response, the provider edge device A sends traffic to both hubs 12, 14 so that the worker path and the protection path are used in parallel.

The traffic from the customer edge device K or J then flows to the provider edge device A, and is copied to the worker hub 12 and to the protection hub 14 by the provider switch 29, which acts as a replicator. The traffic then passes through the respective Ethernet switch 32, 34 for onward transmission in the network 10.

Figure 13:
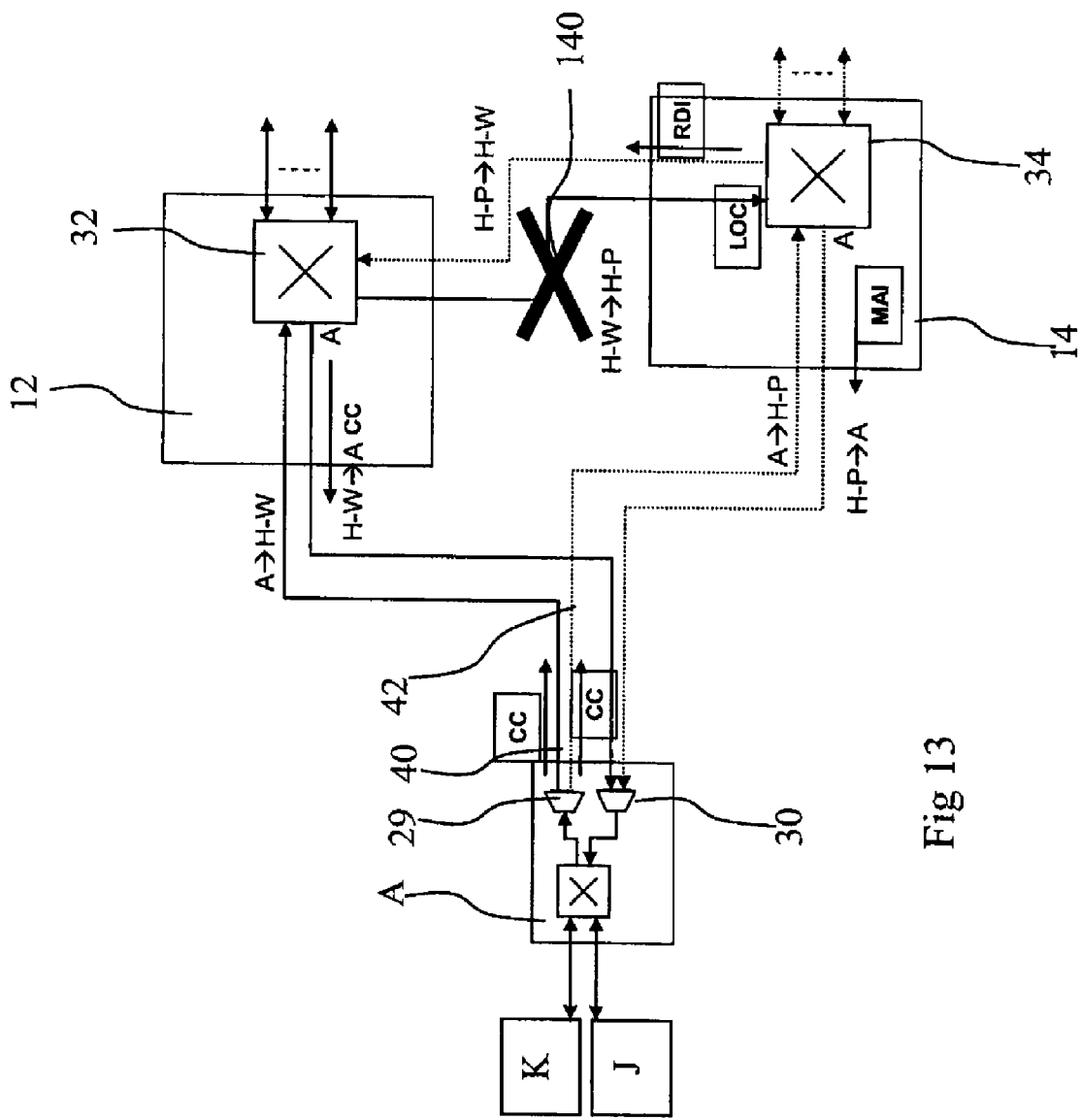

The protection mechanism described with reference to FIG. 12 can also operate in the case of an unidirectional failure, such as when only the path from the worker hub 12 to the protection hub 14 fails, for example. Such a failure 140 is illustrated in FIG. 13. In this scenario, only the path between the Ethernet switch 32 of the worker hub 12 and the Ethernet switch 34 of the protection hub 14 has failed. The CC message from the Ethernet switch 32 of the worker hub 12 to the Ethernet switch 34 of the protection hub 14 is sent but not received, which indicates a loss of connectivity. In response, the Ethernet switch 32 sends an RDI message to the Ethernet switch 34 of the protection hub 14, which is also not received. The Ethernet switch 34 of the protection hub 14 also sends an RDI message to the Ethernet switch 32 of the worker hub 12, which is received. The worker hub 12 now knows that it cannot send traffic to the protection hub 14, but that it can receive traffic from the protection hub 14 that was copied by the provider edge device A. The Ethernet switch 34 then sends a MAI message to the provider edge device A to inform the device A that there is a partial loss of connectivity between the worker hub 12 and the protection hub 14. The provider edge device A responds by sending traffic to both hubs 12, 14 so that the worker path and the protection path are used in parallel. The traffic from the customer edge device K or J now flows to the provider edge device A, and is copied to the worker hub 12 and to the protection hub 14 by the provider switch 29, which acts as a replicator. The traffic then passes through the respective Ethernet switch 32, 34 for onward transmission in the network 10.

Figure 14:
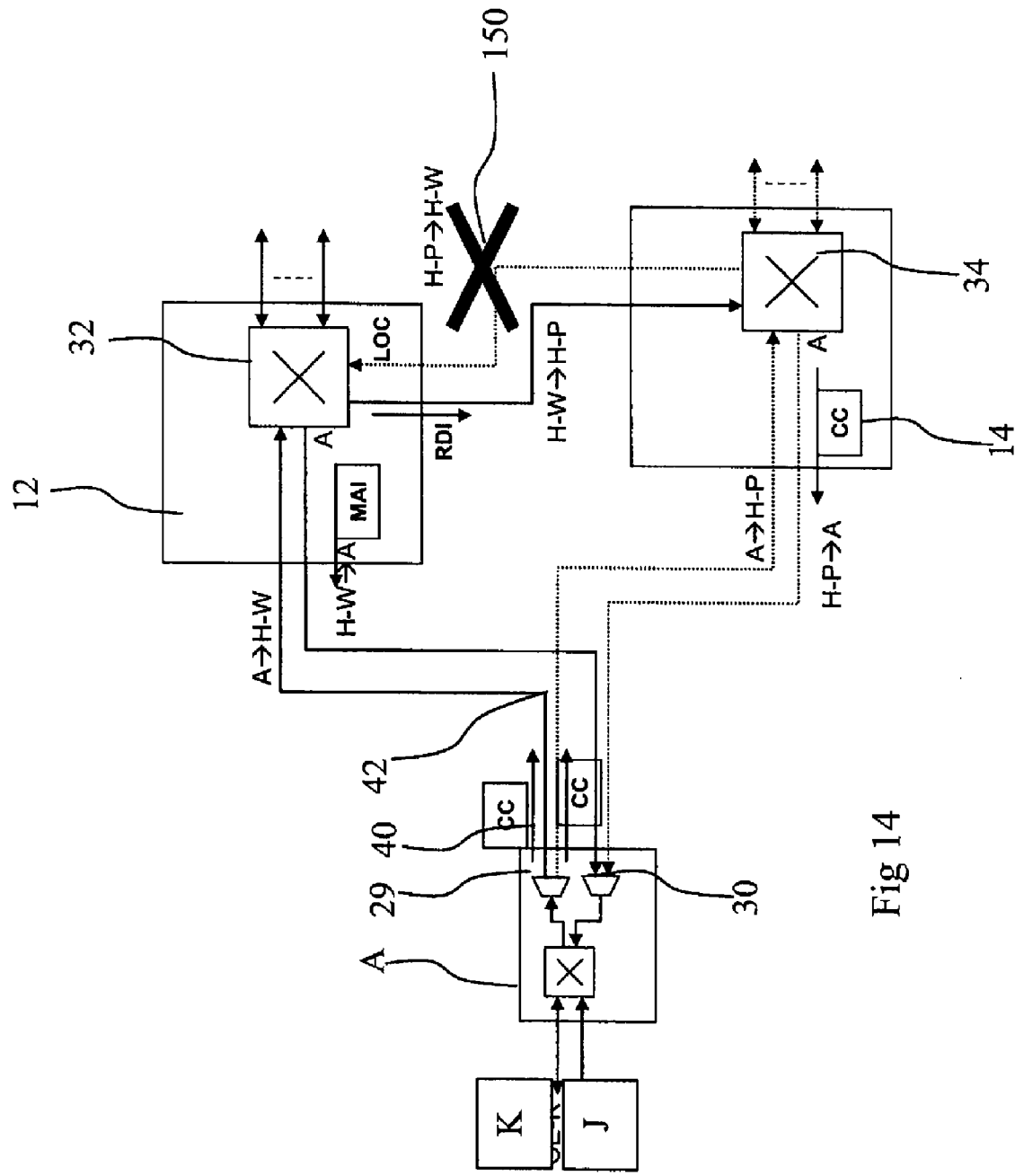

Similarly, the protection mechanism outlined with respect to FIG. 13 also operates in situations where only the path from the protection hub 14 to the worker hub 12 fails. Such a failure 150 is illustrated in FIG. 14. In this scenario, only the path from the Ethernet switch 34 of the protection hub 14 to the Ethernet switch 32 of the worker hub 12 has failed. The CC message from the Ethernet switch 34 of the protection hub 14 to the Ethernet switch 32 of the worker hub 12 is sent but not received, which indicates a loss of connectivity. In response the Ethernet switch 34 sends an RDI message to the Ethernet switch 32 of the worker hub 12, which is also not received. The Ethernet switch 32 of the worker hub 12 also sends an RDI message to the Ethernet switch 34 of the protection hub 14, which is received. The protection hub 14 now knows that it cannot send traffic to the worker hub 12, but that it can receive traffic from the worker hub 12 that was copied by the provider edge device A. The Ethernet switch 32 then sends a MAI message to the provider edge device A to inform the device A that there is a partial loss of connectivity between the worker hub 12 and the protection hub 14. The provider edge device A responds by sending traffic to both hubs 12, 14 so that the worker path and the protection path are used in parallel. The traffic from the customer edge device K or J now flows to the provider edge device A, and is copied to the worker hub 12 and to the protection hub 14 by the provider switch 29, which acts as a replicator. The traffic then passes through the respective Ethernet switch 32, 34 for onward transmission in the network 10.

Figure 15:
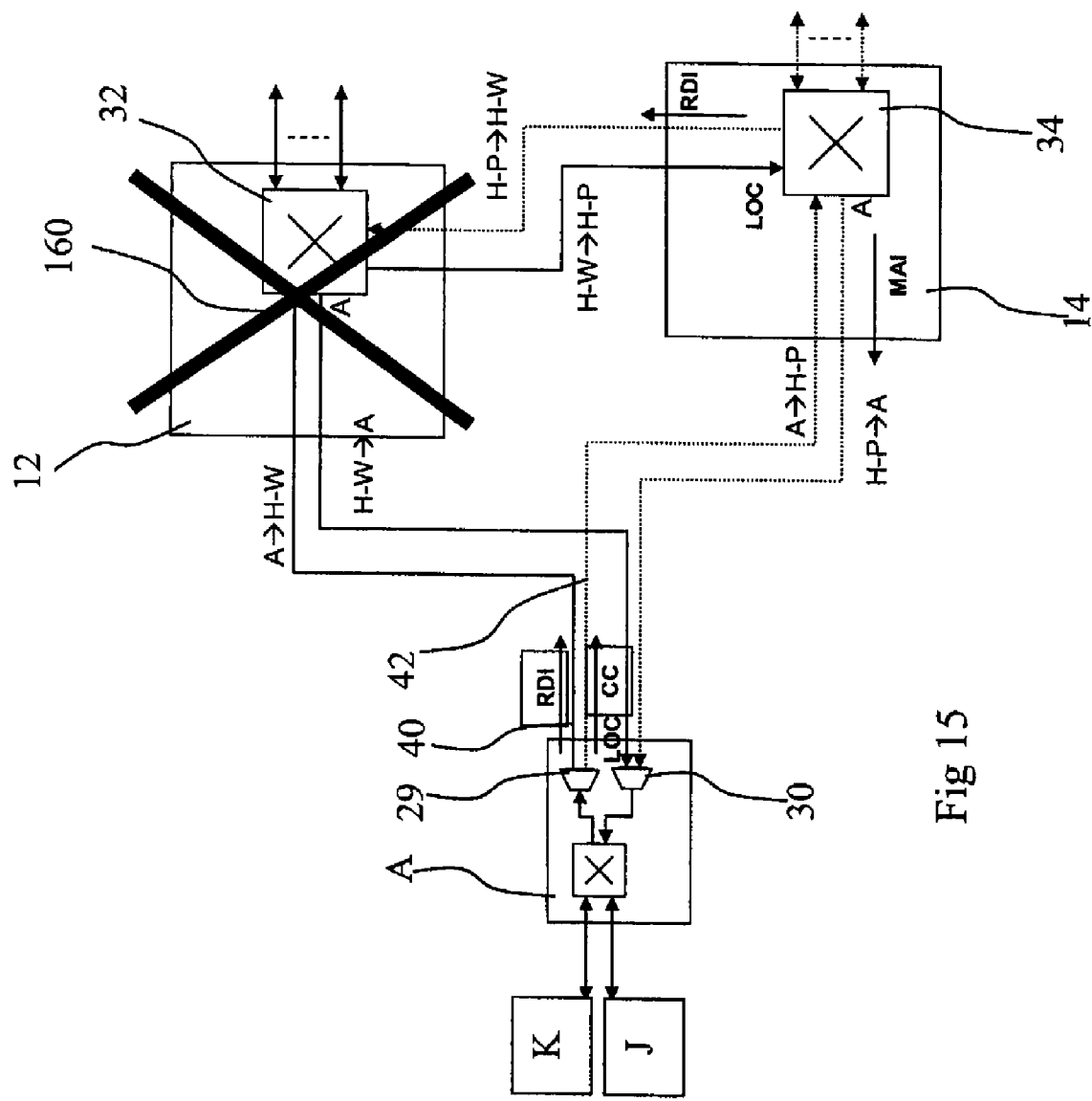

FIG. 15 shows a diagrammatic representation of a failure 160 of the worker hub 12 in a part of the network of FIG. 9, and how the protection mechanism operates to take advantage of the 1:1 protection. In the failure scenario of FIG. 15, the paths between the worker hub 12 and the provider edge device A, and the paths between the worker hub 12 and the protection hub 14 have all failed. In this scenario, the CC messages between the Ethernet switch 32 of the worker hub 12 and the Ethernet switch 34 of the protection hub 14 have been sent but not received. The CC messages from the Ethernet switch 32 of the worker hub 12 to the selector 30 of the provider edge device A, and from the provider switch 29 to the Ethernet switch 32 of the worker hub 12, have also been sent but not received. The protection hub 14 detects that there is a failure because there is a loss of connectivity with the worker hub 12, and sends an RDI message from the Ethernet switch 34 to the worker hub 12. Similarly, the provider edge equipment A detects that there is a failure because there is a loss of connectivity, and sends an RDI message from the provider switch 29 to the Ethernet switch 32 of the worker hub 12. However, since the worker hub 12 has failed, these RDI messages are not received. The protection hub 14 now knows that it cannot communicate with or send traffic to the worker hub 12. The Ethernet switch 34 then sends a MAI message to the provider edge device A to inform device A that there is a loss of connectivity between the worker hub 12 and the protection hub 14. The provider edge device A responds by sending traffic to the protection hub 14 so that the protection path is used. The traffic from the customer edge device K or J now flows to the provider edge device A, and is switched to the protection hub 12 by the provider switch 29. The traffic then passes through the Ethernet switch 34 for onward transmission in the network 10.

Figure 16:
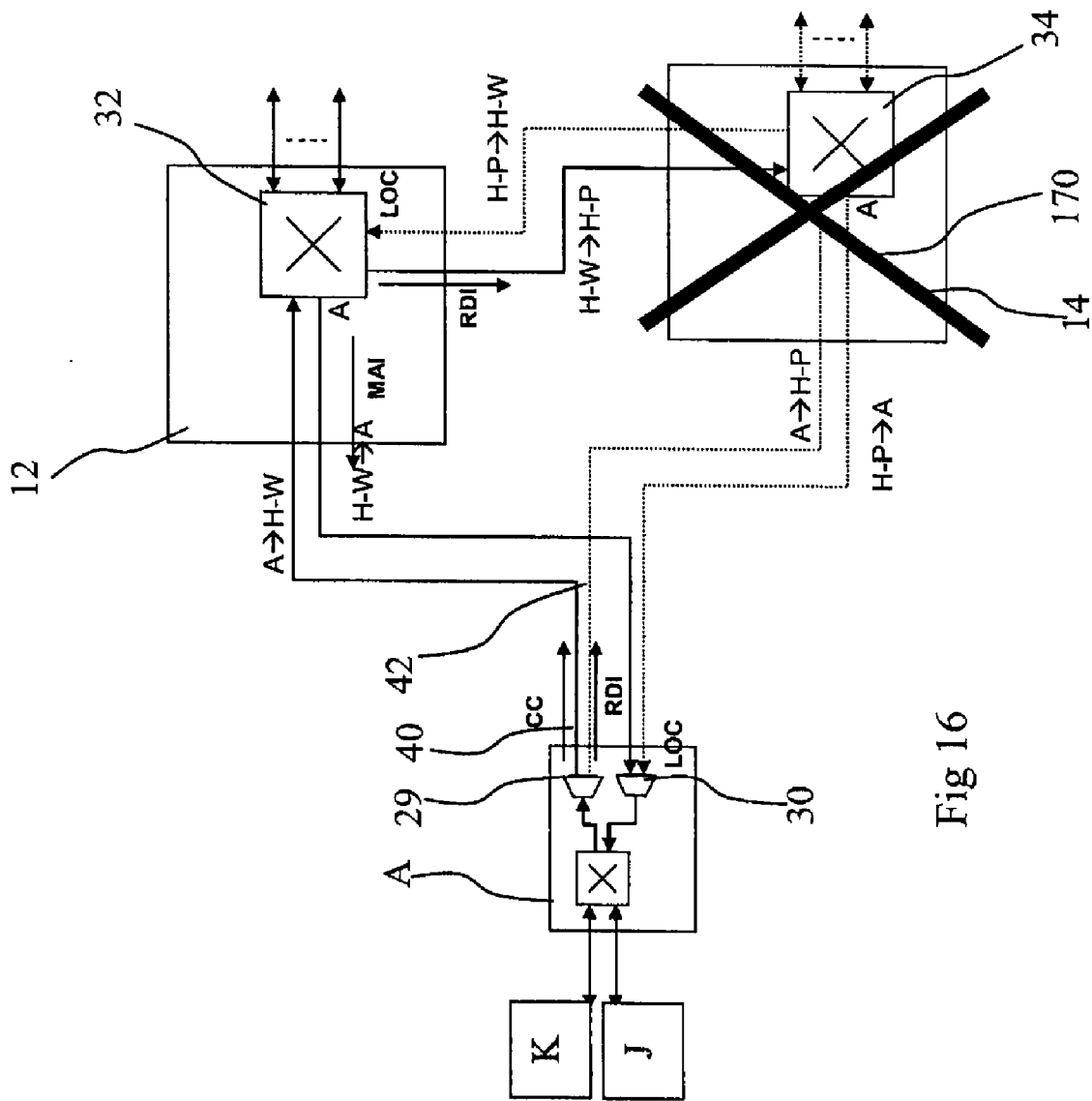

FIG. 16 shows a diagrammatic representation of a failure 170 of the protection hub 14 in a part of the network of FIG. 9, and how the protection mechanism operates to take advantage of the 1:1 protection. In the failure scenario of FIG. 15, the paths between the protection hub 14 and the provider edge device A, and the paths between the worker hub 12 and the protection hub 14, have all failed. In this scenario, the CC messages between the Ethernet switch 32 of the worker hub 12 and the Ethernet switch 34 of the protection hub 14 have been sent but not received. The CC messages from the Ethernet switch 34 of the protection hub 14 to the selector 30 of the provider edge device A, and from the provider switch 29 to the Ethernet switch 34 of the protection hub 14, have also been sent but not received. The worker hub 12 detects that there is a failure because there is a loss of connectivity with protection hub 14, and sends an RDI message from the Ethernet switch 32 to protection hub 14. Similarly, the provider edge equipment A detects that there is a failure because there is a loss of connectivity, and sends an RDI message from the provider switch 29 to the Ethernet switch 34 of protection hub 14. However, since the protection hub 14 has failed, these RDI messages are not received. The worker hub 12 now knows that it cannot communicate with, or send traffic to, the protection hub 14. The Ethernet switch 32 then sends a MAI message to the provider edge device A to inform it that there is a loss of connectivity between the worker hub 12 and the protection hub 14. The provider edge device A responds by continuing to send traffic to the worker hub 12. The traffic from the customer edge device K or J flows to the provider edge device A and continues to be sent to the worker hub 12. The traffic then passes through the Ethernet switch 32 for onward transmission in the network 10.

Figure 17:
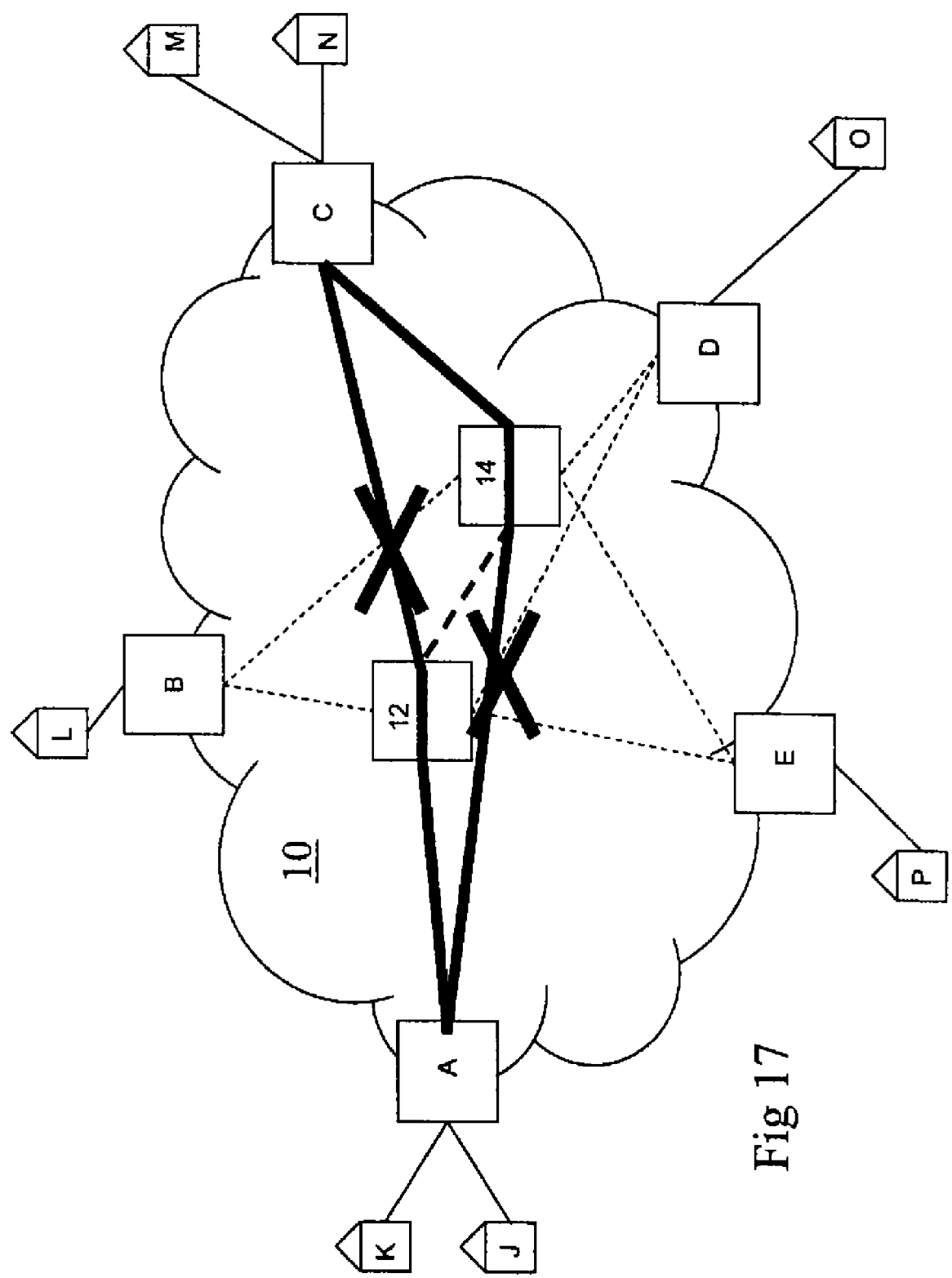
FIG. 17 shows a multiple failure in a connection-oriented packet switched network.

One of the advantages of the above-described embodiments is that traffic is protected in the case of multiple failures as shown in FIG. 17. This Figure shows two failures between the provider edge devices A and C. In particular, the paths from the worker hub 12 to the provider edge device C, and from the provider edge device A to the protection hub 14, have both failed. Such a double failure is relatively common because the worker and protection paths may be physically located in the same duct below the ground surface, for example. The above described embodiments allow traffic to be routed from the provider edge device A to the worker hub 12 and on to the protection hub 14 where it can be sent to the provider edge device C. Such an arrangement is very advantageous in terms of network reliability. The protection schemes of the prior art are only resilient in the case of a single failure. If a second failure occurs with prior art pretections schemes, the connection between the provider edge devices A and C is lost. Recovery in the event of a double failure cannot be performed using known Sub Network Connection Protection (SNCP) or known 1+1 protection according to the prior art.

In the case of the 1+1 embodiment of FIGS. 2-8 with 1+1 protection there is provided an added advantage that the forward data bases of the Ethernet switches 32, 34 are updated in real time. This is because a copy of the traffic is provided to the protection hub 14 and has the effect that the connectivity between customer end stations is assured without loss of traffic. The embodiments of FIGS. 9-16 with 1:1 protection do not have this added advantage because the traffic on the protection path is not copied and the protection path is merely provisioned. The grade of carrier class is slightly lower in the embodiment of FIGS. 9-16 for 1:1 protection compared with the embodiment of FIGS. 2-8 for 1+1 protection, but such a grade is relatively inexpensive to implement because fewer network resources are permanently in use.

Figure 18:
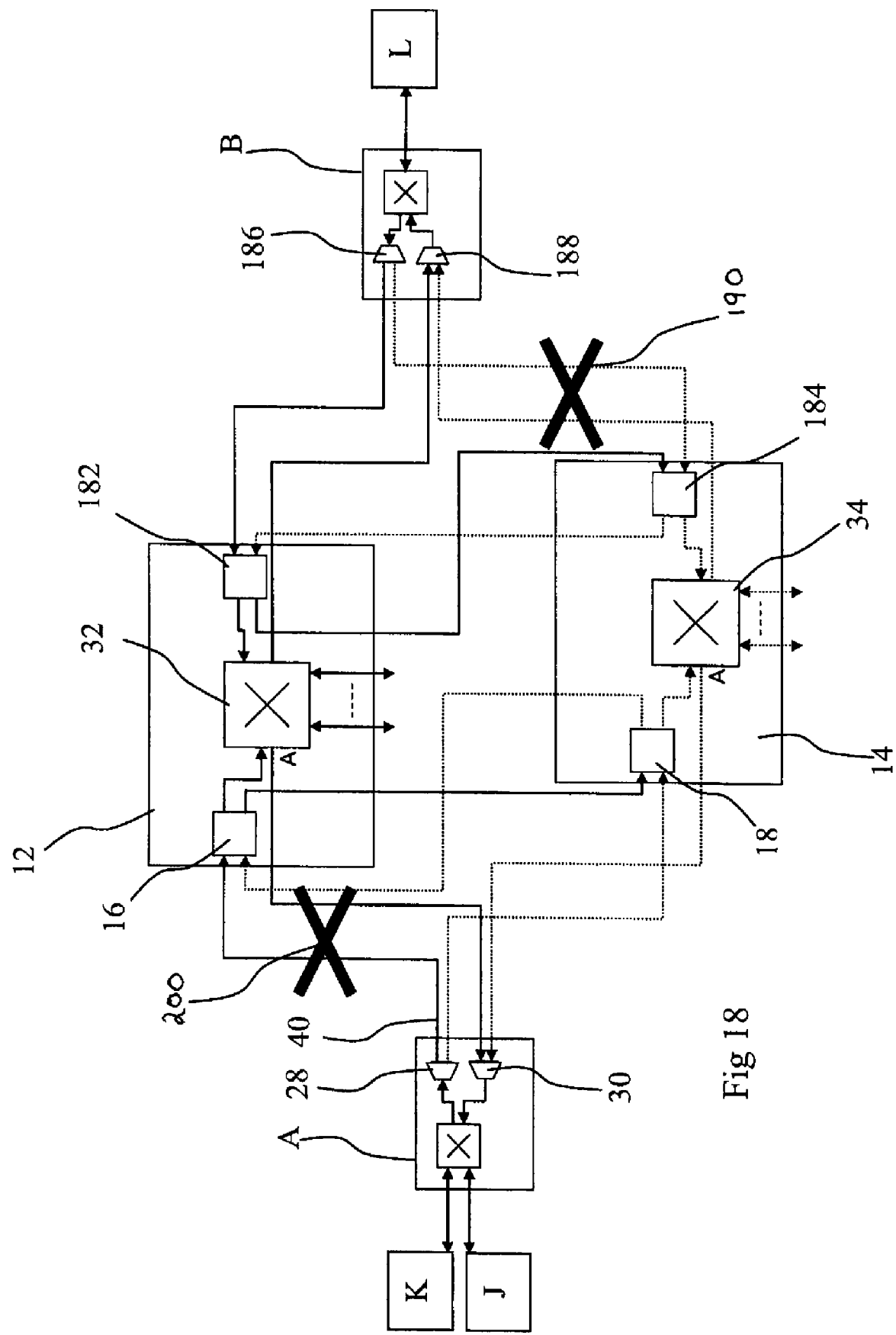
FIG. 18 shows the multiple failure of FIG. 17 in detail for 1+1 protection.

FIG. 18 illustrates the double failure shown of FIG. 17 in more detail relative to the 1+1 embodiment of FIGS. 2-8. In FIG. 18, features similar to those found in the embodiments of FIGS. 2-8 have like reference numerals. FIG. 18 shows two provider edge devices A and B in communication with the worker hub 12 and the protection hub 14. The provider edge device B is in communication with a customer edge device L. The provider edge device A has a bidirectional path between each of the worker hub 12 and the provider hub 14, and is associated with the protection device 16 of the worker hub 12 and the protection device 18 of the protection hub 14. The provider edge device B has a bidirectional path between each of the worker hub 12 and the protection hub 14, and is associated with a protection device 182 of the worker hub 12 and a protection device 184 of the protection hub. The provider edge device B also has a replicator 186 and a selector 188.

FIG. 18 shows a failure 190 along the paths between the provider edge device B and the protection hub 14, and a failure 200 along the paths between the provider edge device A and the worker hub 12. Traffic now flows from the customer edge device K or J to the provider edge device A and on to the protection hub 14 via the path 40. The traffic is then copied at the protection device 18 of the protection hub 14 and one copy passes to the protection device 16 of the worker hub 12 and continues on to the Ethernet switch 32 of the worker hub 12. The traffic is then sent from the Ethernet switch 32 to the selector 188 of the provider edge device B. The other copy of the traffic passes to the Ethernet switch 34 of the protection hub 14. Traffic also flows from the customer edge device L to the provider edge device B and on to the worker hub 12. The traffic is then copied at the protection device 182 of the worker hub 12. One copy is output to the protection device 184 of the protection device and continues to the Ethernet switch 34 of the protection hub 14. The other copy of the traffic is output to the Ethernet switch 32 of the worker hub 12. The traffic is then sent from the Ethernet switch 34 to the selector 30 of the provider edge device A. In this manner, the provider edge devices A and B are able to remain in communication with one another in the event of the failures 190, 200.

It will be understood by the skilled person that the provider edge devices A, B, C, D, E are at the edge of the provider edge network, and that the customer edge devices J, K, L, M, N, O, P are at the edge of the customer edge network. Where such parts of the provider and customer networks begin and end within the overall network 10 may vary such that in some embodiments the provider edge device A, B, C, D, E may not be actually at the edge of the provider network but slightly, within the provider network. Furthermore in some embodiments the customer edge devices J, K, L, M, N, O, P may not be actually at the edge of the provider network but slightly, within the customer network.

It will be appreciated by those skilled in the art that the above-described embodiments are particularly, but not exclusively, relevant to Hub and Spoke networks for the provisioning of multipoint-to-multipoint Ethernet services. The terms worker hub and protection hub are general terms which relate to items of operational equipment which may be nodes that are either operational on an every day basis (i.e. worker hub) or operational on the detection of a fault within the network (i.e. protection hub). Paths between the provider edge devices A, B, C, D, E, the customer edge devices J, K, L, M, N, O, P, the worker hub 12 and the protection hub 14 are via links which may be optical fibres, such that there may be many paths from the network 10 or another network contained within the same link.

The present invention may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

The invention claimed is:

1. A method of path protection in a communications network having a protection hub communicatively connected to a worker hub via a core protection path, and a provider edge device communicatively connected to the worker hub and the protection hub via a worker path and a protection path, respectively, the method comprising:
   detecting a failure in the communications network;
   indicating the failure in the communications network to at least one of the worker hub, the protection hub, and the provider edge device;
   utilizing the core protection path to communicate traffic flow if the failure is detected along a worker path;
   utilizing for protection the worker path and the protection path in parallel to communicate traffic flow only in response to the failure being detected along the core protection path;
   generating multiple copies of the traffic flow input to the worker hub;
   outputting one copy of the traffic flow to the protection hub; and
   forwarding another copy of the traffic flow onward for transmission in the communications network.

2. The method of claim 1 further comprising using an Operation and Maintenance (OAM) message to perform at least one of detecting the failure, and indicating the failure.

3. The method of claim 2 wherein the OAM message comprises at least one of:
   a Continuity Check (CC) message to check a connectivity of a path;
   an Alarm Indication Signal (AIS) message to propagate a failure indication in the network;
   a Remote Defect Indication (RDI) message to identify a unidirectional link failure; and
   a Missing Alignment indication (MAI) message to indicate a loss of connectivity between worker hub and the protection hub.

4. The method of claim 1 further comprising:
   generating multiple copies of the traffic flow that is input to the provider edge device;
   outputting one copy of the traffic flow to the worker hub; and
   outputting another copy of the traffic flow to the protection hub.

5. The method of claim 1 further comprising:
   provisioning a copy of the traffic flow received at the provider edge device;
   outputting a copy of the traffic flow to the worker hub; and
   outputting another copy of the traffic flow to the protection hub when the failure is detected.

6. The method of claim 1 further comprising:
   provisioning copies of the traffic flow that is received at the worker hub;
   forwarding a copy of the traffic flow onward for transmission in the communications network; and
   outputting another copy of the traffic flow to the protection hub when the failure is detected.

7. The method of claim 1 further comprising:
   receiving the traffic flow at the provider edge device from the worker hub;
   receiving a copy of the traffic flow at the provider edge device from the protection hub; and
   selecting which of the received traffic flows to output.

8. A path protection system for a communications network comprising:
   a protection hub;
   a worker hub communicatively connected to the protection hub via a core protection path;
   a provider edge device communicatively connected to the worker hub via a respective worker path, and with the protection hub via a respective protection path;
   wherein the system is configured to:
      detect a failure in the communications network;
      indicate the failure in the communications network to at least one of the worker hub, the protection hub, and the provider edge device;
      communicate a traffic flow along the core protection path if the detected failure occurs along the worker path; and communicate the traffic flow for protection along the worker path and the protection path in parallel only in response to detection of the failure along the core protection path;

wherein the worker hub comprises one or more worker protection devices, and wherein each provider edge device is associated with a respective one of the worker protection devices; and wherein each worker protection device comprises a worker replicator configured to:
generate one or more copies of the traffic flow received at the worker hub;
output one copy of the traffic flow to the protection hub; and
forward another copy of the traffic flow onward for transmission in the communications network.

9. The path protection system of claim 8 wherein each worker protection device comprises a worker selector configured to select the traffic flow from at least two traffic flows that it receives as input.

10. The path protection system of claim 8 wherein the protection hub comprises one or more backup protection devices, and wherein the provider edge device is associated with a respective one of the backup protection devices.

11. The path protection system of claim 10 wherein each backup protection device comprises a respective protection replicator configured to:
generate one or more copies of a traffic flow received at the protection hub;
output one copy of the traffic flow to the worker hub; and
forward another copy of the traffic flow onward for transmission in the communications network.

12. The path protection system of claim 11 wherein each backup protection device further comprises a respective backup selector configured to select one of the traffic flows from at least two traffic flows that it receives as input.

13. The path protection system of claim 8 wherein the provider edge device comprises a respective provider replicator configured to:
generate one or more copies of the traffic flow received at the provider edge device;
output a copy of the received traffic flow to the worker hub; and
output another copy of the received traffic flow to the protection hub.

14. The path protection system of claim 13 wherein the provider replicator is further configured to send the copy of the traffic flow to the protection hub when the failure is detected.

15. The path protection system of claim 8 further comprising a worker replicator configured to:
generate one or more copies of the traffic flow received at the worker hub; and
forward one copy of the traffic flow onward for transmission in the communications network; and
send another copy of the traffic flow to the protection hub when the failure is detected.

16. The path protection system of claim 8 wherein the provider edge device comprises a respective provider selector configured to:
receive the traffic flow from the worker hub;
receive a copy of the traffic flow from the protection hub; and
select which of the traffic flows to use.

17. The path protection system of claim 8 wherein the worker hub comprises a worker Ethernet switch, and wherein the protection hub comprises a protection Ethernet switch.

18. The path protection system of claim of claim 17 further comprising one or more forward databases, each being associated with at least one of the Ethernet switches, and configured to be updated in real time.

19. The path protection system of claim 8 further comprising communicating an Operation and Maintenance (OAM) message to perform at least one of detecting the failure and indicating the failure.

20. The path protection system of claim 19 wherein the OAM message includes at least one of:
a Continuity Check (CC) message to check connectivity of a path;
an Alarm Indication Signal (AIS) message to propagate a failure indication in the network;
a Remote Defect Indication (RDI) message to identify an unidirectional link failure; and
a Missing Alignment indication (MAI) message to indicate a loss of connectivity between worker hub and the protection hub.

21. A first protection device for a communications network, the first protection device comprising:
first and second inputs configured to receive communications traffic;
first and second outputs configured to output communications traffic;
a first replicator connected to the first and second inputs, and configured to:
generate first and second copies of a first traffic flow received at the first input; and
send the first copy to the first output; and
a first selector connected to the first replicator, and configured to:
receive the second copy from the first replicator;
receive a first copy of a second flow of communications traffic at the second input; and
select one of the second copy of the first traffic flow and the first copy of the second traffic flow to send to the second output;
the first protection device being configured to communicate with a second protection device having third and fourth inputs and third and fourth outputs, the first output being communicatively connected to the fourth input, and the second input being communicatively connected to the third output, and wherein the first protection device is configured to:
receive a copy of the second traffic flow at the second input; and
send a copy of the first traffic flow to the second protection device via the first output.

22. The first protection device of claim 21 wherein the first protection device is included in a worker hub.

23. The first protection device of claim 22 wherein the second protection device is included in a protection hub.

* * * * *

UNITED STATES PATENT AND TRADEMARK OFFICE
CERTIFICATE OF CORRECTION

PATENT NO. : 8,165,012 B2
APPLICATION NO. : 12/143160
DATED : April 24, 2012
INVENTOR(S) : Martinotti et al.

Page 1 of 2

It is certified that error appears in the above-identified patent and that said Letters Patent is hereby corrected as shown below:

In Fig. 1, Sheet 1 of 18, delete "Fig" and insert -- Fig. --, therefor at each occurrence throughout the drawings.

In Fig. 3, Sheet 3 of 18, delete " 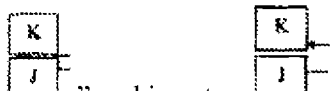 " and insert -- 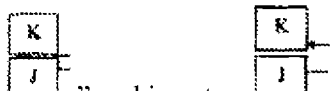 --, therefor.

In Fig. 3, Sheet 3 of 18, delete " $A\_H\text{-}P \rightarrow H\text{-}W$ " and insert -- $A\_H\text{-}P \rightarrow H\text{-}W$ --, therefor.

In Fig. 4, Sheet 4 of 18, delete " 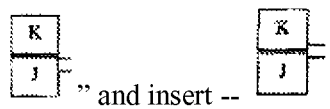 " and insert -- 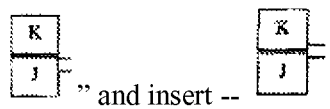 --, therefor.

In Fig. 4, Sheet 4 of 18, delete " $A\_H\text{-}W \rightarrow H\text{-}F$ " and insert -- $A\_H\text{-}W \rightarrow H\text{-}P$ --, therefor.

In Fig. 4, Sheet 4 of 18, delete " $A\_H\text{-}P \rightarrow H\text{-}W$ " and insert -- $A\_H\text{-}P \rightarrow H\text{-}W$ --, therefor.

In Fig. 7, Sheet 7 of 18, delete "  " and insert --  --, therefor.

In Fig. 7, Sheet 7 of 18, delete " $A\_H\text{-}W \rightarrow H\text{-}F$ " and insert -- $A\_H\text{-}W \rightarrow H\text{-}P$ --, therefor.

In Fig. 12, Sheet 12 of 18, delete " 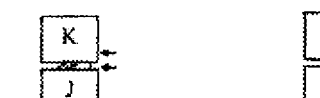 " and insert -- 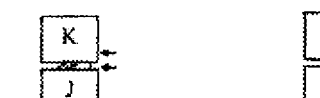 --, therefor.

In Fig. 14, Sheet 14 of 18, delete "  " and insert --  --, therefor.

Signed and Sealed this
Eighteenth Day of December, 2012

David J. Kappos
*Director of the United States Patent and Trademark Office*

CERTIFICATE OF CORRECTION (continued)
U.S. Pat. No. 8,165,012 B2

In Column 2, Line 37, delete "of;" and insert -- of: --, therefor.

In Column 5, Line 35, delete "2." and insert -- 2; --, therefor.

In Column 5, Line 37, delete "2-7." and insert -- 2-7; --, therefor.

In Column 15, Line 26, delete "protection worker" and insert -- worker --, therefor.

In Column 18, Line 28, delete "pretections" and insert -- protections --, therefor.

In Column 22, Line 7, in Claim 18, delete "of claim of claim" and insert -- of claim --, therefor.